US006456324B1

(12) United States Patent
Yamada et al.

(10) Patent No.: US 6,456,324 B1
(45) Date of Patent: Sep. 24, 2002

(54) IMAGE SHIFTING IMAGE PICKUP APPARATUS USING FILTER FOR REMOVING SPATIAL FREQUENCY COMPONENT

(75) Inventors: Eiji Yamada; Toshiaki Harada, both of Tenri; Tetsuo Iwaki, Yamatokoriyama, all of (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 08/997,559

(22) Filed: Dec. 23, 1997

(30) Foreign Application Priority Data

Dec. 27, 1996 (JP) ............................................ 8-349159
Jun. 30, 1997 (JP) ............................................ 9-173817

(51) Int. Cl.[7] .......................... H04N 5/225; H04N 9/64; G06K 9/40

(52) U.S. Cl. ........................ 348/219; 348/246; 382/264

(58) Field of Search ................................ 348/218, 219, 348/335, 442, 607, 222, 266, 272, 273, 246; 382/264, 275

(56) References Cited

U.S. PATENT DOCUMENTS 4,253,120 A * 2/1981 Levine ....................... 348/246
5,969,757 A * 10/1999 Okada et al. ............... 348/219

FOREIGN PATENT DOCUMENTS

JP 63284980 11/1988

* cited by examiner

*Primary Examiner*—Wendy R. Garber
*Assistant Examiner*—Rashawn N. Tillery
(74) *Attorney, Agent, or Firm*—Birch, Stewart, Kolasch & Birch, LLP

(57) ABSTRACT

An image pick-up apparatus is provided with: a charge-coupled device for picking up imaging light from a subject and forming image data; an image-shift mechanism for shifting the charge-coupled device to a plurality of relative positions with respect to the imaging light so as to allow the charge-coupled device to form the image data at the relative positions; an LPF constituted by a filter for removing a spatial frequency component that appears due to a light-quantity difference between a plurality of pieces of image data generated by the charge-coupled device through the image-shift mechanism; and a memory control section for combining the plurality of image data. With this arrangement, it is possible to suppress a striped pattern due to the light-quantity difference, and consequently to improve the image quality.

20 Claims, 31 Drawing Sheets

L
OPTICAL SYSTEM
1
CHARGE-COUPLED DEVICE
2
A/D CONVERSION
3
IMAGE MEMORY
4
LPF
5
DRIVE
6
GENERATE SYNCHRONOUS SIGNAL
7
MEMORY CONTROL
8
SIGNAL PROCESSING
9
RECORDING MEDIUM
10

L
OPTICAL SYSTEM
51
CHARGE-COUPLED DEVICE
52
A/D CONVERSION
53
IMAGE MEMORY
54
INTERPOLATION-PROCESSING SECTION
55
DRIVE
56
GENERATE SYNCHRONOUS SIGNAL
57
MEMORY CONTROL
58
LPF
59
RECORDING MEDIUM
60

PRIOR ART

PRIOR ART

PRIOR ART

PRIOR ART

PRIOR ART

IMAGE SHIFTING IMAGE PICKUP APPARATUS USING FILTER FOR REMOVING SPATIAL FREQUENCY COMPONENT

FIELD OF THE INVENTION

The present invention relates to an image pick-up apparatus that is capable of providing images with high resolution, and more particularly, concerns an image pick-up apparatus which picks up a plurality of images by relatively shifting imaging light from a subject, and combines these images into an image with an enhanced resolution.

BACKGROUND OF THE INVENTION

Recently, still-image pick-up apparatuses, so-called electronic still cameras, have been put into practical use as image pick-up apparatuses for picking up still images. Further, home-use video cameras have been put into practical use as motion-image pick-up apparatuses for picking up motion images. In these image pick-up apparatuses, a charge-coupled device is used as a means for picking up an image by receiving imaging light from a subject.

The charge-coupled device is a so-called two-dimensional CCD image sensor. In the charge-coupled device, a plurality of light-receiving regions are arranged in a matrix format on an image-forming surface that is a two-dimensional plane.

The image pick-up apparatus converges imaging light from a subject onto the image-forming surface of the charge-coupled device, and allows the light-receiving regions to receive the light. The imaging light is photoelectrically transferred to an electric signal indicating the quantity of light receipt within the light-receiving region, and then recorded in a recording medium as an image signal. This image signal, when visually displayed alone on a display device, forms a still image. Further, these image signals, when visually displayed successively in the order in which they were picked up form motion images.

In the image pick-up apparatus of this type, an image that has been picked up consists of pixels that correspond to light-receiving regions of the charge-coupled devices. In other words, the operation of each charge-coupled device is the same as sampling the quantity of imaging light that spatially varies in succession by using a spatial sampling frequency. The spatial sampling frequency is given as an inverse number to the array period of the pixels. Therefore, the change in light quantity of imaging light is smoothed for each pixel. Consequently, the higher the number of pixels, the more the resolution of an image is improved.

As one of the methods for improving the resolution of an image, CCD image pick-up apparatuses using an image shift have been proposed. The image shift is a technique for shifting a light-receiving position of imaging light that is directed to the charge-coupled device. In the CCD image pick-up apparatus using the image shift, a plurality of image pick-up processes are carried out while shifting the light-receiving position of imaging light from a subject on the image-forming surface. The images, picked up in this manner, are superimposed so that the light-receiving positions of the image are coincident with one another, thereby forming an output image.

Japanese Laid-Open Patent Publication No. 284980/1988 (Tokukaishou 63-284980) discloses one of such CCD image pick-up apparatuses using the image-shift system. In this CCD image pick-up apparatus, a parallel flat plate, which transmits light, is interpolated between a light-converging lens for converging light from a subject and a charge-coupled device. The parallel flat plate is aligned in either of two states, that is, the first state in which it is aligned perpendicular to the light axis and the second state in which it is inclined in an diagonal direction of 45 degrees with respect to the horizontal and vertical directions of visual field. When the parallel flat plate is aligned in the first state, the charge-coupled device picks up a first image, and thereafter, when the parallel flat plate is aligned in the second state, it picks up a second image.

FIG. 32 is a drawing that shows a pixel array equivalent to an output image. This output image forms a monochrome image. The light-receiving regions of the charge-coupled device are arranged in a matrix format with a horizontal array period PH and a vertical array period PV. Here, it is supposed that the first image and the second image have been picked up while shifting light from a subject in a diagonal direction by ½ pixel from each other. In this case, in the output image formed by combining the two sheets of images, the pixels are arranged with a horizontal array period of (PH/2) and a vertical array period of (PV/2). In other words, the number of pixels is increased fourfold in the entire image.

In FIG. 32, pixels s1 represent actual pixels whose pixel data has been obtained from the first original image that has been picked up in the first state. Further, pixels s2 represent actual pixels whose pixel data is obtained from the second original image that has been picked up in the second state. In FIG. 32, these actual pixels are indicated by hatched regions. Thus, in the output image, the actual pixels whose pixel data has been obtained are arranged in a diced pattern.

Each of the pixels that have no pixel data (known as virtual pixels) are adjacent to two actual pixels in each array direction. The pixel data of these virtual pixels can be obtained by, for example, interpolating the average value of the pixel data of the adjacent four actual pixels. In this manner, a conventional CCD image pick-up apparatus can obtain a high-resolution image consisting of pixels the number of which is four times as many as the number of the light-receiving regions of the charge-coupled device.

In the above-mentioned CCD image pick-up apparatus, image signals corresponding to one sheet of an output image are generated from the two original images that have been successively picked up through the image shifting process. Accordingly, in this apparatus, it is desirable to have equal exposing time upon picking up the two original images so as not to cause a difference in light quantity between the two original images. However, even in the case of equal exposing time, a difference in light quantity may occur between the two original images due to flickers of a fluorescent lamp or other reasons.

If there is a difference in light quantity between the two sheets of original images, a diced pattern, which is originally not supposed to appear in the imaging light, tends to appear in the output image, resulting in degradation in the image quality. FIG. 33 shows an example of the diced pattern that appears even when an image of a flat blank pattern is picked up. In FIG. 33, figures given in the respective pixels represent values of the pixel data in the corresponding pixels, and it is defined that pixel s1 in the first image has pixel data of 100, that is, the light quantity. Further, pixel s2 of the second image, which is originally supposed to have pixel data of 100, has a reduced light quantity due to the above-mentioned phenomenon so that it merely has pixel data of 90. In this case, if the image data of a virtual pixel is found by carrying out an average interpolation on the pixel data of the adjacent four actual pixels, the pixel data is calculated as 95. In this manner, if there is a difference in light quantity between the two sheets of images, a diced pattern appears as shown in FIG. 33, instead of a blank pattern that is originally supposed to be obtained from pixel data of 100 in all the pixels.

In order to solve the above-mentioned problem, the applicant of the present application has proposed several methods for correcting light-quantity differences in an image pick up apparatus having a light-quantity-difference correcting means that was previously filed in Japan, that is, "Image pick-up apparatus" (Japanese Patent Application No. 267552/1996 (Tokuganhei 8-267552)). The methods for correcting light-quantity differences, proposed by the applicant of the present application, will be described below.

First, referring to FIGS. 34 through 36, the first light-quantity-difference correction method (light-quantity-difference correction method (I)) will be discussed as follows: FIG. 34 shows a histogram of one of the blocks obtained by dividing a first original image into predetermined blocks, and FIG. 35 shows a histogram of one of the blocks obtained by dividing a second original image into predetermined blocks.

The light-quantity-difference correcting means corrects the light-quantity difference between two screens by combining the minimum value, the average value, and the maximum value among values (which take, for example, integral numbers ranging from not less than 0 to not more than 255 in the case of 8-bit recording) of the pixel data of pixels corresponding to each block of the two original images by using the following methods:

Here, it is supposed that the minimum value, the average value and the maximum value of pixel data of pixels corresponding to the first image are $\alpha$, $\beta$ and $\gamma$ respectively and that the minimum value, the average value and the maximum value of pixel data of pixels corresponding to the second image are $\delta$, $\epsilon$and $\zeta$respectively.

Then, as shown in FIG. 36, it is supposed that the values of pixel data of the pixels corresponding to the second image before a light-quantity-difference correction are plotted on the axis of the abscissa and the values of pixel data of the pixels corresponding to the second image after the light-quantity-difference correction are plotted on the axis of the ordinate. Here, the minimum value $\alpha$, the average value $\beta$ and the maximum value $\delta$ of the pixel data corresponding to the first image are plotted on the axis of the ordinate so that point $\eta$ ($\delta\alpha$), point $\theta$ ($\epsilon$, $\beta$) and point $\iota$ ($\gamma$,$\zeta$) are obtained. Further, the above-mentioned points $\eta$, $\theta$ and $\iota$ are connected by a straight line. Among the pixel data of the pixels of the second image, with regard to pixel data except for the minimum value $\delta$, the average value $\epsilon$ and the maximum value $\gamma$, values of the pixel data after the correction can be obtained by carrying out a projection on the axis of the ordinate with respect to the straight line made by connecting $\eta$, $\theta$ and $\iota$.

With this arrangement, the predetermined pixel values (that is, the minimum value, the average value and the maximum value) of pixel data of the pixels of the second image are respectively converted so as to coincide with predetermined values of pixel data of the first image by the light-quantity-difference correcting means.

Thus, it becomes possible to correct the light-quantity difference in imaging light between the two sheets of original images, and consequently to prevent degradation in the image quality of an output image due to the above-mentioned light-quantity difference.

Next, the second light-quantity-difference correction method (light-quantity-difference correction method (II)), which carries out a light-quantity-difference correction by finding the moving average, will be discussed as follows.

In this light-quantity-difference correction method (II), with respect to a certain pixel of the second image that is to be subjected to a light-quantity-difference correction, the moving average is found at this pixel position for each of the two sheets of original images, and the difference between the moving averages, that is, the light-quantity difference, is found. Then, the light-quantity difference is added to the pixel data of the corresponding pixel of the second image. This process is carried out on each pixel of the second image so as to perform the light-quantity-difference correction.

Moreover, in the third light-quantity-difference correction method (light-quantity-difference correction method (III)), a sensor, which detects the quantity of light for picking up each image, is separately installed, and a light-quantity-difference correction is carried out based on the values of the light quantity of each original image obtained from the sensor output.

Here, in light-quantity-difference correction methods (I) and (II) proposed by the applicant of the present application, the light-quantity-difference correction is carried out without causing any degradation in the image quality with respect to the blank pattern shown in FIG. 33 or patterns merely having gradual light-quantity changes.

However, the problem with light-quantity-difference correction method (I) is that block borders tend to appear in the output image (similar to the known block distortion appearing in image-compressing techniques) since the light-quantity-difference correction is carried out for each block. Moreover, since the light-quantity-difference correction is carried out based on the three light quantities, that is, the minimum value, the average value and the maximum value, errors in these three parameters tend to give serious adverse effects. For example, if the maximum value of the second original image signal becomes greater than the original light quantity due to noise, etc., the second original image signal, after having the light-quantity-difference correction, provides an image darker than that provided by the first original image signal, thereby leaving the diced pattern without being erased.

Moreover, the problem with light-quantity-difference correction method (II) is that false edges tend to appear at edge portions, causing double edges or an insufficient light-quantity-difference correction in the periphery of edges.

Furthermore, in light-quantity-difference correction method (III) having the separately-installed sensor for detecting light quantity, the light-quantity correction is carried out over the entire original image. For this reason, if the light-quantity difference varies depending on regions, such as a light-axis portion and peripheral portions, of the original image, it is not possible to carry out the light-quantity-difference correction properly. In particular, in the case when exposing time is controlled by a mechanical shutter, the exposing time for the vicinity of the light axis becomes longer than that for the peripheral portions, thereby causing degradation in the image quality.

SUMMARY OF THE INVENTION

The first objective of the present invention is to provide an image pick-up apparatus which, even in the case when there is a light-quantity difference between two original images or in the case when portions of the images have different light quantities, can prevent degradation of the image quality of an output image by properly correcting the light-quantity difference.

In order to achieve the above-mentioned objective, the image pick-up apparatus of the present invention is provided with: an image pick-up section for picking up imaging light from a subject and forming image data; an image-shift mechanism for shifting the image pick-up section to a plurality of relative positions with respect to the imaging light so as to allow the image pick-up section to form the image data at the relative positions; an LPF, constituted by a filter, for eliminating a spatial frequency component that is generated due to a light-quantity difference between a plurality of pieces of image data that the image pick-up section has formed by using the image-shift mechanism; and a memory control section for combining the plurality of the image data.

In the above-mentioned image pick-up apparatus, the LPF, which serves as a filter for correcting light-quantity differences occurring between a plurality of original image signals that have been generated by an image-shift operation made by the image-shift mechanism, is installed; therefore, it is possible to suppress striped patterns occurring due to the light-quantity differences, and consequently to improve the image quality.

Moreover, after combining the plurality of the original images, the filtering by the LPF is carried out prior to an interpolating process; thus, it becomes possible to reduce the amount of processes concerning the light-quantity correction (filtering), and consequently to allow high-speed processing.

Furthermore, by carrying out the filtering of the LPF after the interpolating process of the combined image, it becomes possible to suppress striped patterns occurring due to the interpolating process simultaneously with the suppression of the striped patterns occurring due to the light-quantity differences, and consequently to improve the image quality. It also becomes possible to correct edges in the horizontal or vertical direction accurately.

For a fuller understanding of the nature and advantages of the invention, reference should be made to the ensuing detailed description taken in conjunction with the accompanying drawings.

DESCRIPTION OF THE EMBODIMENTS

EMBODIMENT 1

The following description will discuss one embodiment of the present invention.

Figure 1:
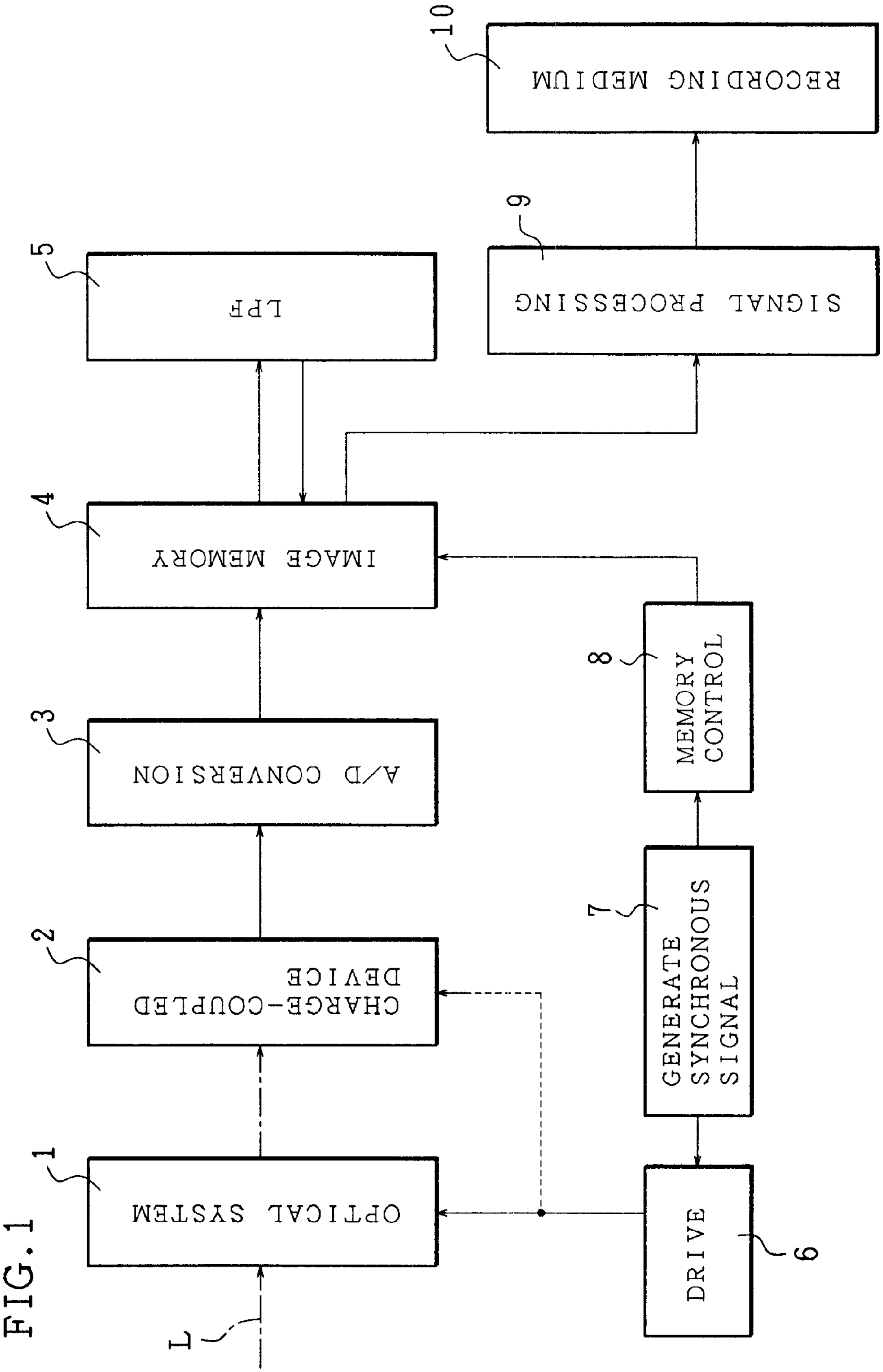
FIG. 1 is a schematic block diagram that shows a structural example of an image pick-up apparatus of the present invention.

As illustrated in FIG. 1, an image pick-up apparatus of the present embodiment is provided with an optical system 1, a charge-coupled device 2, an A/D converter (an Analog to Digital Converter) 3, an image memory 4, an LPF 5, a driving section 6, a synchronous-signal generating section 7, a memory control section 8, a signal-processing section 9 and a recording medium 10.

Imaging light from a subject is converged by a light-converging lens of the optical system 1, and then focused onto the image-forming surface of the charge-coupled device 2. A plurality of light-receiving regions PD are arranged in the matrix format on the image-forming surface of the charge-coupled device 2.

Besides the light-converging lens for converging imaging light, the optical system 1 has an image-shift mechanism. The image-shift mechanism is driven by the driving section 6 so that it allows the image-forming position of the imaging light to shift to first and second image-forming positions on the image-forming surface of the charge-coupled device 2 every predetermined time. This operation is referred to as an image-shift operation.

The charge-coupled device 2 allows the respective light-receiving regions PD to receive the imaging light from the optical system 1 for a predetermined exposing time so that the imaging light is picked up. After the lapse of exposing time, the charge-coupled device 2 transfers light-receipt data from the respective light-receiving regions PD to the A/D converter 3 as the first or second original image signal every predetermined time. Here, the first and second original image signals are image signals that can be obtained by picking up imaging lights when the respective imaging lights are focused onto the first and second image-forming positions. The respective original image signals are constituted by light-receipt data that correspond to the quantities of light receipt at the respective light-receiving regions PD.

The A/D converter 3 converts the first and second original image signals that are analog signals from the charge-coupled device 2 into digital signals, and stores them in the image memory 4.

The synchronous-signal generating section 7 generates a synchronous signal that corresponds to the picking-up operation of the two original image signals, and sends this signal to the driving section 6 and the memory control section 8. The driving section 6 carries out the image-shift operation by using the image-shift mechanism in the optical system 1. Thus, in the charge-coupled device 2, imaging light, which is to be received by the light-receiving regions PD, is offset from the imaging light before the shift in the image of the subject. The memory control section (image-combining means) 8 stores the light-receipt data in the image memory 4 with the light-receipt data being associated with every two original image signals that are derived from the different image-forming positions.

The low-pass filter (hereinafter, referred to as LPF) 5 (light-quantity difference correction means) carries out a light-quantity difference correction, which will be described later, on the original image signals from the image memory 4, and then again stores the resulting original image signals in the image memory 4. At this time, the original image signals before the light-quantity difference correction in the image memory 4 are erased since the original image signals after the light-quantity difference correction are overwritten thereon.

The original image signals after the light-quantity difference correction, stored in the image memory 4, are given to the signal-processing section 9 (interpolating means). The signal-processing section 9 interpolates the two original image signals so as to generate image data that would not be obtained by the image pick-up. In other words, it forms image data for pixels that have no data upon combining the two original image signals, and stores the image signal after the interpolation in the recording medium 10 as an output image signal for an output image.

Figure 2:
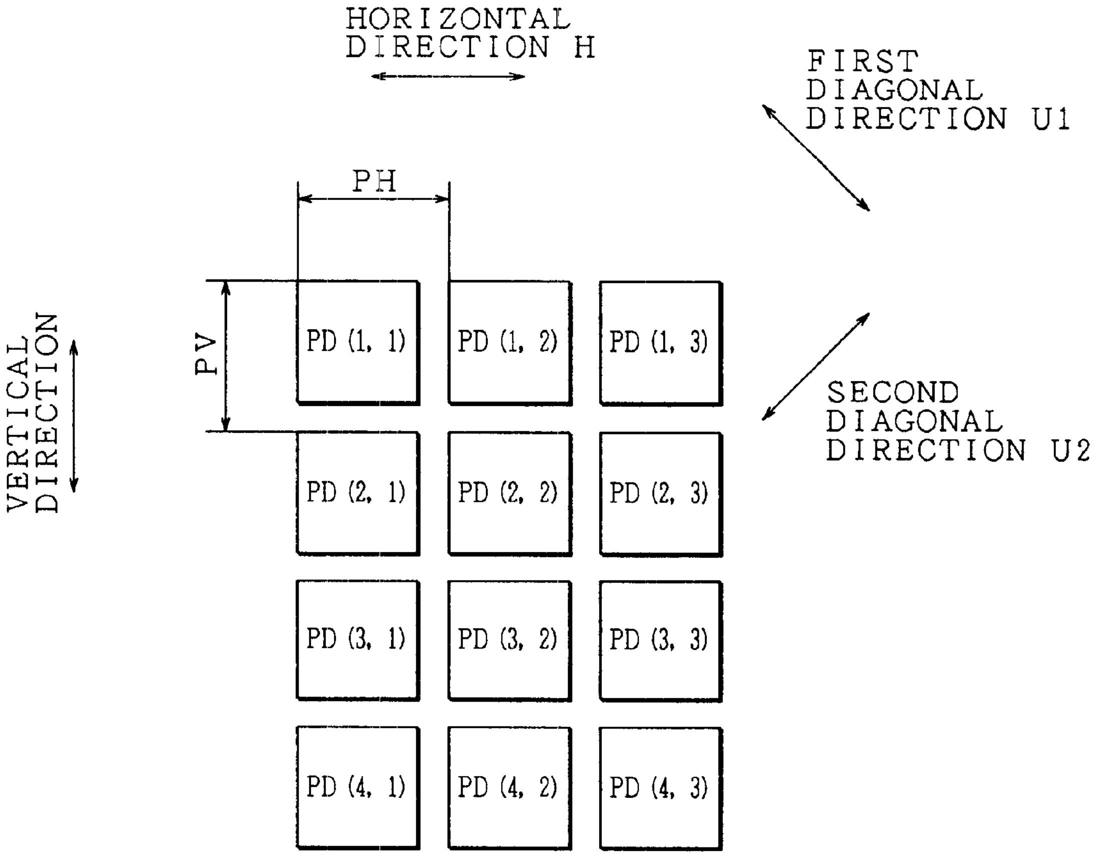
FIG. 2 is a plan view that shows a specific pixel array on the image-forming surface of a charge-coupled device installed in the image pick-up apparatus.

Next, an explanation will be given of a specific example of the image pick-up apparatus of the present embodiment. FIG. 2 is a plan view that shows a specific pixel array on the image-forming surface of the charge-coupled device 2. In the charge-coupled device 2, "N×M" number of light-receiving regions PD are arranged in a matrix format with array periods of PH and PV in horizontal and vertical directions. The horizontal and vertical directions H and V are orthogonal to each other. Here, it is supposed that a direction that passes through points PD (1, 1), PD (2, 2), PD (3, 3) . . . is referred to as a first diagonal direction U1. Further, it is also supposed that a direction that passes through points PD (1, 3), PD (2, 2), PD (3, 1) . . . is referred to as a second diagonal direction U2. Moreover, when the first and second diagonal directions U1 and U2 are generally referred to or when either of the diagonal directions is arbitrarily selected, the direction is referred to as "diagonal direction U".

In this pixel array, sampling frequencies fH and fV in the horizontal and vertical directions H and V with respect to imaging light are given as inverse numbers to the array periods in the horizontal and vertical directions H and V, and are respectively represented by the following equations (1) and (2):

$$fH=1/PH \qquad (1)$$

$$fV=1/PV \qquad (2)$$

Further, a group of components that are aligned on a straight line in the horizontal direction H are, hereinafter, referred to as "rows". Similarly, a group of components that are aligned on a straight line in the vertical direction V are referred to as "columns". In a group of components that are arranged in a matrix format, respective rows are successively referred to as the first row, the second row . . . the N-th row from the top side to the bottom side of the paper surface. Similarly, respective columns are successively referred to as the first column, the second column . . . the M-th column from the right side to the left side of the paper surface. Among these components, when a single component that belongs to the n-th row and the m-th column is referred to, the component is represented by a reference numeral that generally indicates the component together with symbols (n, m). Here, each of n and m is an arbitral integer ranging from not less than 1 to not more than N or M. In FIG. 2, the array pattern of the light-receiving regions PD is schematically represented by 12 light-receiving regions PD (1, 1) to PD (4, 3) having 4 rows and 3 columns. In the actual image-forming surface of the charge-coupled device 2, the construction as shown FIG. 2 are periodically repeated in the horizontal and vertical directions H and V.

Figure 3:
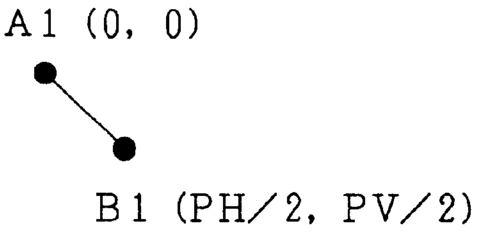
FIG. 3 is an explanatory drawing that shows a positional relationship between the first and second image-forming positions of imaging light of Embodiment 1.

FIG. 3 is a drawing that indicates a positional relationship between the first and second image-forming positions with respect to imaging light. Based on the first image-forming position A1, the second image-forming position B1 is shifted from the first image-forming position A1 by half the length of the array period PH in the horizontal direction H and by half the length of the array period PV in the vertical direction V of the light-receiving regions PD.

When imaging light is focused onto the first and second image-forming positions A1 and B1, the charge-coupled device 2 picks up the imaging light and provides the first and second original image signals.

Figure 4:
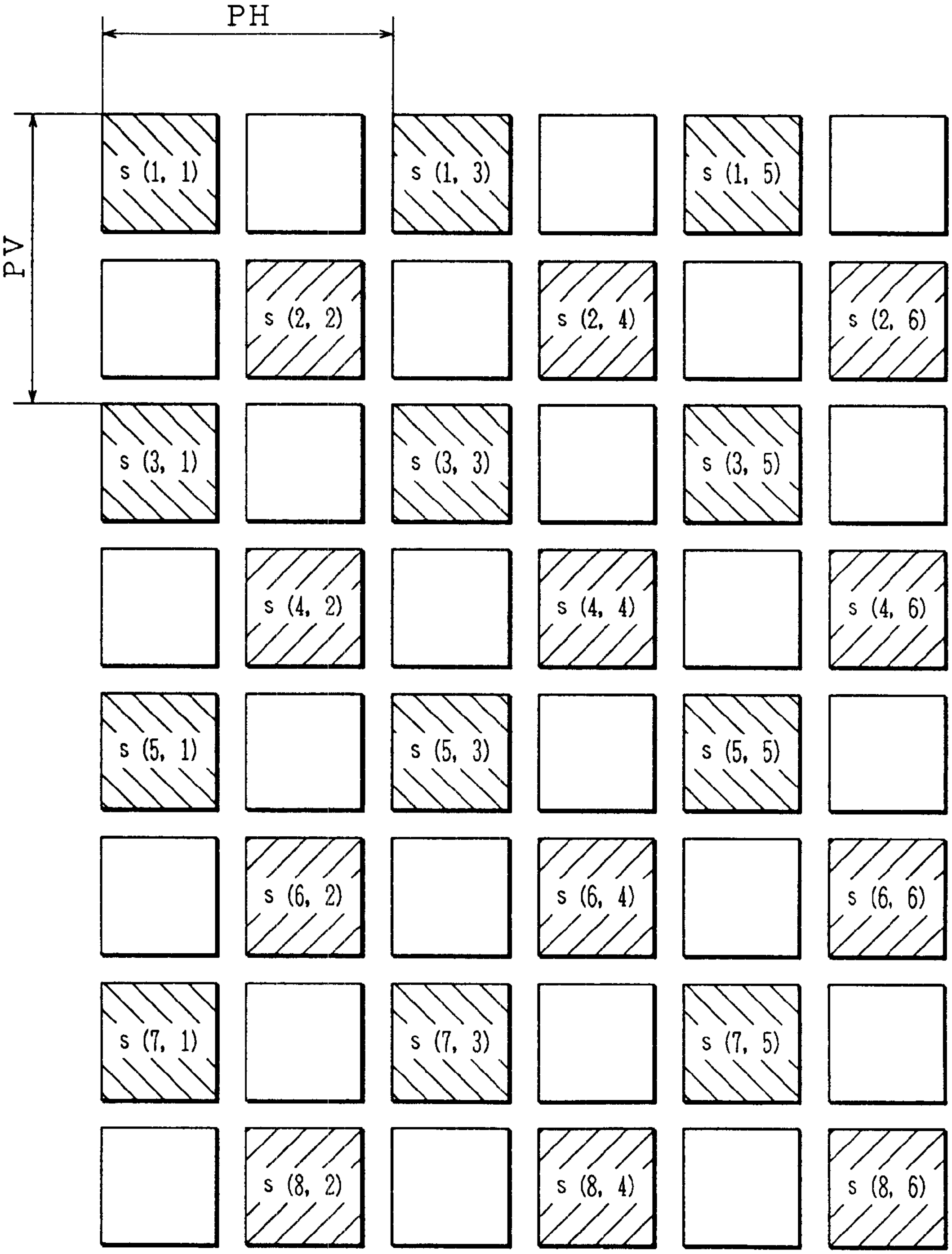
FIG. 4 is an explanatory drawing that shows a combined image constituted by the first and second original images of Embodiment 1.

FIG. 4 is a drawing that indicates a combined image that consists of the first and second original images that represent the original image. Here, those pixels representing the first original image are indicated by hatched portions with lines slanting down to the right, and those pixels representing the second original image are indicated by hatched portions with lines slanting up to the right. The combined image is produced by superimposing the first and second original images in a manner so as to match spatial positions at the time of the image pick-up.

This combining operation is carried out using the image memory 4, by determining addresses to which pieces of pixel data of the first and second original images are alternately stored and storing them in the corresponding addresses. In other words, the combined image is an image in which the first and second original images are superimposed in a manner so as to offset from each other with the same shift length in opposite directions in parallel with the same direction as the aforementioned shift direction of the image-forming positions.

With respect to pixels s of the combined image corresponding to the pixels of the first original image, both n and m of their subscript (n, m) are odd numbers. Further, with respect to pixels s of the combined image corresponding to the pixels of the second original image, both n and m of their subscript (n, m) are even numbers. Those pixels that have pixel data and that correspond to either of the original images are hereinafter referred to as actual pixels.

With respect to the entire combined image, the actual pixels that are pixels corresponding to either of the first and second original images are arranged in a diced pattern. A virtual pixel having no pixel data is placed between every two adjacent actual pixels aligned in the horizontal or vertical direction. The virtual pixel does not correspond to any of the pixels of the first and second original images. With respect to the virtual pixel, either norm of the subscript (n, m) of pixel s is an even number and the other is an odd number.

The signal-processing section 9 carries out an interpolation and substitution on the pixel data of the surrounding actual pixels so as to produce pixel data of the virtual pixel.

In the interpolating process in the signal-processing section 9, for example, the linear interpolation method or the cubic convolution interpolation method is adopted. In the linear interpolation method, the pixel data of the virtual pixel is interpolated by using, for example, the average value of the pixel data of the four actual pixels surrounding the virtual pixel in the combined image. In the cubic convolution interpolation method, the pixel data of the virtual pixel is interpolated by using the pixel data of 16 actual pixels surrounding the virtual pixel.

Further, the signal-processing section 9 carries out a gamma correction. The electric-photoelectric transfer characteristic of a cathode-ray tube (Brawn tube) has a non-linearity. Therefore, light-receipt data corresponding to the quantity of light receipt is corrected so that the quantity of light receipt of the image pick-up apparatus is proportional to the light-emitting intensity of the cathode-ray tube. This correction is referred to as the gamma correction.

The array period of an output image becomes half as long as the pixel array of the first and second original image with respect to any of the horizontal and vertical directions. For this reason, supposing that the resolution of the first and second original images is taken as a standard resolution, the resolution of the output image has a higher resolution with respect to any of the directions H and V as compared with the standard resolution. The array period of the output image with respect to the pixels in the diagonal direction U becomes half as long as the array period of the combined image. However, the output image signal is obtained by interpolating the combined image signal. Even if the array period of the pixels of the output image becomes smaller than that of the combined image due to pixels that have been increased by the interpolating process, the resolution has no difference from that of the combined image. Therefore, the resolution of the output image in the diagonal direction U is reduced as compared with the resolution that is supposed to be obtained by the array period of the pixels.

Next, an explanation will be given of the LPF 5 which carries out a light-quantity difference correction that is a feature of the present invention. The LPF 5 is a low-pass filter that is applied to the combined image consisting of the actual pixels so as to remove the diced pattern that appears when there is a light-quantity difference between the two original images.

Figure 5:
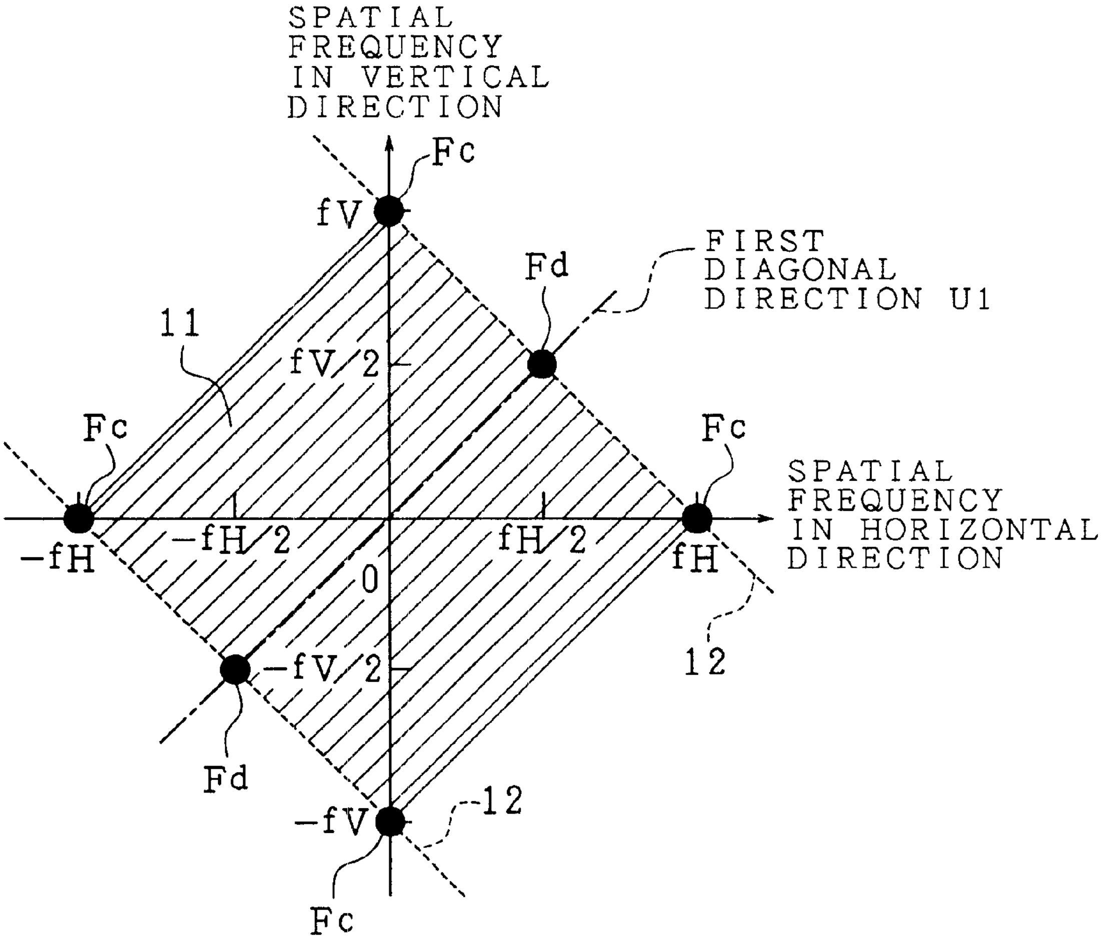
FIG. 5 is a plan view of a spatial frequency indicating the base band of the combined image of Embodiment 1.

FIG. 5 is a graph in which the low-pass characteristic of the LPF 5 and the base band of the combined image are plotted on the spatial-frequency coordinates. The base band 11 is represented by a rectangular region (a hatched region in the drawing) that has the following four points as its apexes.

(fH, 0)

(0, fV)

(−fH, 0)

(0, −fV)

For example, (fH, 0) represents a spatial frequency having a spatial frequency fH in the horizontal direction and a spatial frequency 0 in the vertical direction. Here, with respect to repetitions (pattern) appearing in a specific direction with a constant cycle, the above-mentioned spatial frequency is referred to as the number of repetitions per their unit length, and also referred to, in the present embodiment, as the repetitions (pattern) themselves. The frequency component of the diced pattern that appears when there is a light-quantity difference between the two original images has a period of two times the amount of shift resulted from the image shift with its direction coincident with the direction of the image shift.

Therefore, the frequency component is located on a border line connecting point (fH, 0) and point (0, fv) and a border line connecting point (−fH, 0) and point (0, −fV) in FIG. 5. For this reason, the LPF 5 is desirably set so that the gain on the border lines is zero, and also desirably set so that it has the base band 11 as its pass band. Moreover, in order not to attenuate the frequency component that the original images originally possess, that is, in order not to make the image blurred, the LPF 5 is desirably set so that the gain is 1 in a region within the rectangular region except the border lines. Furthermore, in order not to cause distortion in the image after having been subjected to the low-pass process, that is, the combined image after the light-quantity difference correction, the LPF 5 is desirably set so that it has a linear phase characteristic.

Such a low-pass filter that satisfies the above-mentioned requirements tends to become very high in its order. Low-pass filters with a high order tend to take time in processing and require a large circuit scale, thereby failing to meet practical use. Therefore, a proper order is set by taking into consideration the conditions the low-pass filter must satisfy and the required processing time and circuit scale. For example, low-pass filter r1 that is represented by the following equation (3) is listed.

$$r1 = \frac{1}{64}\begin{bmatrix} 0 & 0 & 0 & 1 & 0 & 0 & 0 \\ 0 & 0 & -5 & 0 & -5 & 0 & 0 \\ 0 & -5 & 0 & 25 & 0 & -5 & 0 \\ 1 & 0 & 25 & 0 & 25 & 0 & 1 \\ 0 & -5 & 0 & 25 & 0 & -5 & 0 \\ 0 & 0 & -5 & 0 & -5 & 0 & 0 \\ 0 & 0 & 0 & 1 & 0 & 0 & 0 \end{bmatrix} \quad (3)$$

This low-pass filter r1 is a two-dimensional low-pass filter that is represented by a matrix having 7 rows and 7 columns. Supposing that a component at row p and column q is respresented by r1 (p, q), a calculation for carrying out a light-quantity difference correction on the combined image by using low-ass filter r1 is obtained by the following equation (4):

$$t(n, m) = \sum_{p=1}^{7}\sum_{q=1}^{7} s(n+p-4, m+q-3)\cdot r1(p, q) \quad (4)$$

Here, S(n, m) represents a pixel at row n and column m of the combined image before the light-quantity difference correction. Further, t(n, m) represents a pixel at row n and column of the combined image after the light-quantity difference correction. As shown in FIG. 4, the virtual pixels have no data. The calculation of equation (4) is carried out, supposing that the pixel data of each virtual pixel is zero. Low-pass filter r2, which is more simplified than low-pass filter r1, is represented by the following equation (5).

$$r2 = \frac{1}{16}\begin{bmatrix} 0 & 0 & 1 & 0 & 0 \\ 0 & 2 & 0 & 2 & 0 \\ 1 & 0 & 4 & 0 & 1 \\ 0 & 2 & 0 & 2 & 0 \\ 0 & 0 & 1 & 0 & 0 \end{bmatrix} \quad (5)$$

This low-pass filter r2 is a two-dimensional low-pass filter that is represented by a matrix having 5 rows and 5 columns. Supposing that a component at row p and column q is represented by r2(p, q), a calculation for carrying out a light-quantity difference correction on the combined image by using low-pass filter r2 is obtained by the following equation (6):

$$t(n, m) = \sum_{p=1}^{5}\sum_{q=1}^{5} s(n+p-3, m+q-3)\cdot r2(p, q) \quad (6)$$

The advantage of low-pass filter r2 is that the amount of calculations required is less than that required for low-pass filter r1. However, low-pass filter r2 has such a tendency that the gain of the pass band 11 becomes smaller than 1 as it comes closer to the border lines. The resulting disadvantage is that it has an inferior pass band characteristic as compared with low-pass filter r1, resulting in blurredness in the combined image after the light-quantity difference correction.

Moreover, low-pass filter r3, whose amount of calculations is further reduced, is represented by the following equation (7):

$$r3 = \frac{1}{8}\begin{bmatrix} 1 & 0 & 0 & 0 \\ 0 & 5 & 0 & 0 \\ 0 & 0 & 5 & 0 \\ 0 & 0 & 0 & -1 \end{bmatrix} \quad (7)$$

This low-pass filter r3 is a one-dimensional low-pass filter that is represented by a matrix having 4 rows and 4 columns. Supposing that a component at row p and column q is represented by r3(p, q), a calculation for carrying out a light-quantity difference correction on the combined image by using low-pass filter r3 is obtained by the following equation (8):

$$t(n, m) = \sum_{p=1}^{4} s(n+p-2, m+p-2)\cdot r3(p, p) \quad (8)$$

This low-pass filter r3 low-pass filters the combined image in the image-shift direction as shown in FIG. 3. As described earlier, the frequency component of the diced pattern appearing when there is a light-quantity difference between the two original images is equal to the spatial frequency Fd which has a period of two times the directed line segment A1B1 representing the amount of image shift shown in FIG. 3. The spatial frequency Fd is a spatial frequency whose direction is equal to the first diagonal direction U1 and which has a value represented by the following equation in this direction.

$$1/\sqrt{(PH)^2+(PV)^2}$$

Different from the above-mentioned two-dimensional low-pass filters, low-pass filter r3 is limited so that it cuts off only a portion over a broken line 12 (see FIG. 5) including the spatial frequency Fd. Even this low-pass filter r3, which deals with the first diagonal direction U1, can carry out a light-quantity difference correction sufficiently.

Low-pass filter r4, whose amount of calculations is further reduced, is represented by the following equation (9)

$$r4 = \frac{1}{4}\begin{bmatrix} 1 & 0 & 0 \\ 0 & 2 & 0 \\ 0 & 0 & 1 \end{bmatrix} \quad (9)$$

This low-pass filter r4 is a one-dimensional low-pass filter that is represented by a matrix having 3 rows and 3 columns. Supposing that a component at row p and column q is represented by r4(p, q), a calculation for carrying out a light-quantity difference correction on the combined image by using low-pass filter r4 is obtained by the following equation (10):

$$t(n, m) = \sum_{p=1}^{3} s(n+p-2, m+p-2) \cdot r4(p, p) \quad (10)$$

This low-pass filter r4 low-pass filters the combined image in the image-shift direction as shown in FIG. 3. The advantage of low-pass filter r4 is that the amount of calculations required is less than that required for low-pass filter r3. However, low-pass filter r4 has such a tendency that the gain of the pass band 11 becomes smaller than 1 as it comes closer to the broken line 12. The resulting disadvantage is that it has an inferior pass band characteristic as compared with low-pass filter r3, resulting in blurredness in the combined image after the light-quantity difference correction.

As described above, the image pick-up apparatus of the present embodiment carries out a light-quantity difference correction by using a low-pass filter; therefore, it is possible to carry out the process more easily as compared with conventional apparatuses. Further, since the low-pass process is carried out for each pixel, it is possible to properly correct even partial differences in light quantity between the two original images, and consequently to prevent degradation in the output image.

Additionally, in the present embodiment, (1) after producing a combined image by combining two original image signals, (2) the resulting combined image is subjected to a low-pass filtering process, and (3) the signal-processing section 9 finds the image data of virtual pixels by interpolation; however, this processing sequence is not limited by this order, and the low-pass filtering process may be carried out after finding the image data of the virtual pixels (see Embodiment 5 which will be described later) or the low-pass filtering process and the interpolation may be carried out at the same time.

Moreover, in this embodiment, for example, low-pass filters r1 through r4 are used as the LPF 5; however, the present invention is not intended to be limited by this construction. For example, as will be described later in Embodiment 5, two horizontal and vertical one-dimensional low-pass filters may be used so that the cut-off frequencies correspond to the two opposing apexes of the base band 11 shown in FIG. 5.

EMBODIMENT 2

The following description will discuss another embodiment of the present invention. Here, the image pick-up apparatus of the present embodiment has a similar construction to the image pick-up apparatus of Embodiment 1; therefore, for convenience of explanation, those members that have the same functions and that are described in Embodiment 1 are indicated by the same reference numerals and the description thereof is omitted.

Different from the aforementioned Embodiment 1, the image pick-up apparatus of the present embodiment carries out the image shift in the horizontal direction H.

Figure 6:
FIG. 6 is an explanatory drawing that shows a positional relationship between the first and second image-forming positions of Embodiment 2.

FIG. 6 is a drawing that indicates a positional relationship between the first and second image-forming positions with respect to imaging light. Based on the first image-forming position A2, the second image-forming position B2 is shifted from the first image-forming position A2 by half the length of the array period PH (PH/2) in the horizontal direction H of the light-receiving regions PD.

When imaging light is focused onto the first and second image-forming positions A2 and B2, the charge-coupled device 2 picks up the imaging light and provides the first and second original image signals.

Figure 7:
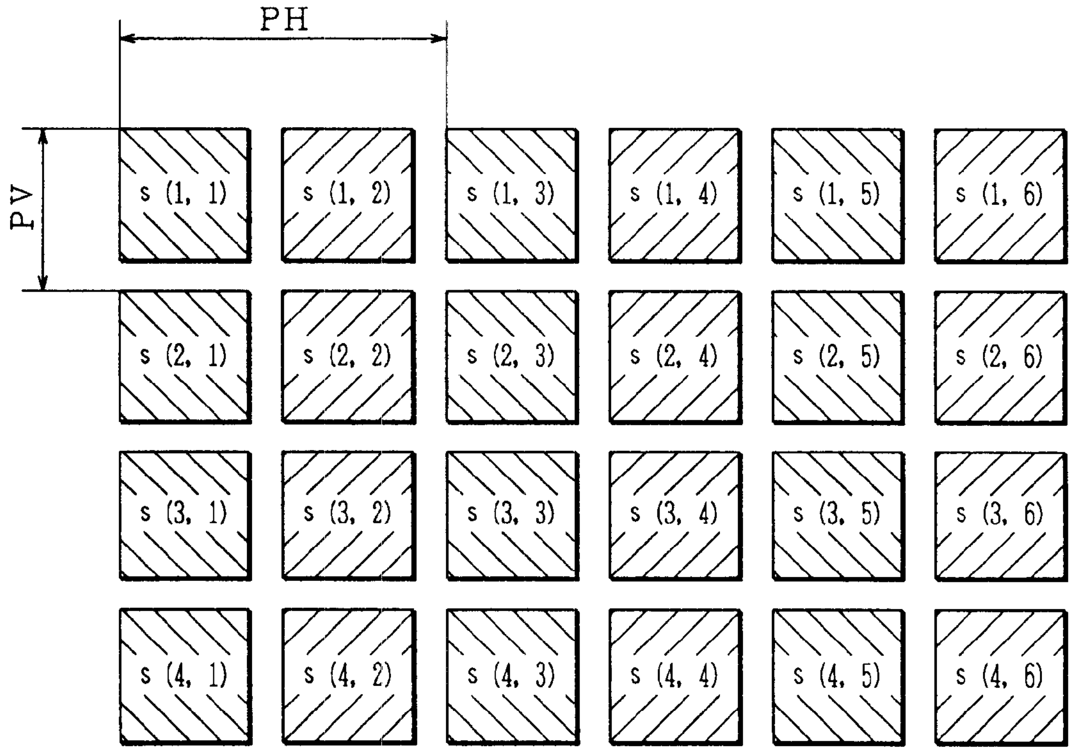
FIG. 7 is an explanatory drawing that shows a combined image constituted by the first and second original images of Embodiment 2.

FIG. 7 is a drawing that indicates a combined image that consists of the first and second original images that represent the original image. Here, those pixels representing the first original image are indicated by hatched portions with lines slanting down to the right, and those pixels representing the second original image are indicated by hatched portions with lines slanting up to the right.

The combined image is produced by superimposing the first and second original images in a manner so as to match spatial positions at the time of the image pick-up. This combining operation is carried out using the image memory 4, by determining addresses to which pieces of pixel data of the first and second original images are alternately stored and storing them in the corresponding addresses. In other words, the combined image is an image in which the first and second original images are superimposed in a manner so as to offset from each other with the same shift length in opposite directions in parallel with the same direction as the aforementioned shift direction of the image-forming positions.

With respect to pixels s of the combined image corresponding to the pixels of the first original image, m of their subscript (n, m) is an odd number. Further, with respect to pixels s of the combined image corresponding to the pixels of the second original image, m of their subscript (n, m) is an even number.

With respect to the entire combined image, the actual pixels that are pixels corresponding to either of the first and second original images are arranged in a vertical striped pattern. Further, in the present embodiment, the pixel arrangements of the combined image and the output image are the same.

The signal-processing section 9 carries out the gamma correction.

The array period of an output image becomes halt as long as the pixel array of the first and second original images with respect to the horizontal direction. For this reason, supposing that the resolution of the first and second original images is taken as a standard resolution, the resolution of the output image has a higher resolution with respect to the horizontal direction H as compared with the standard resolution.

Figure 8:
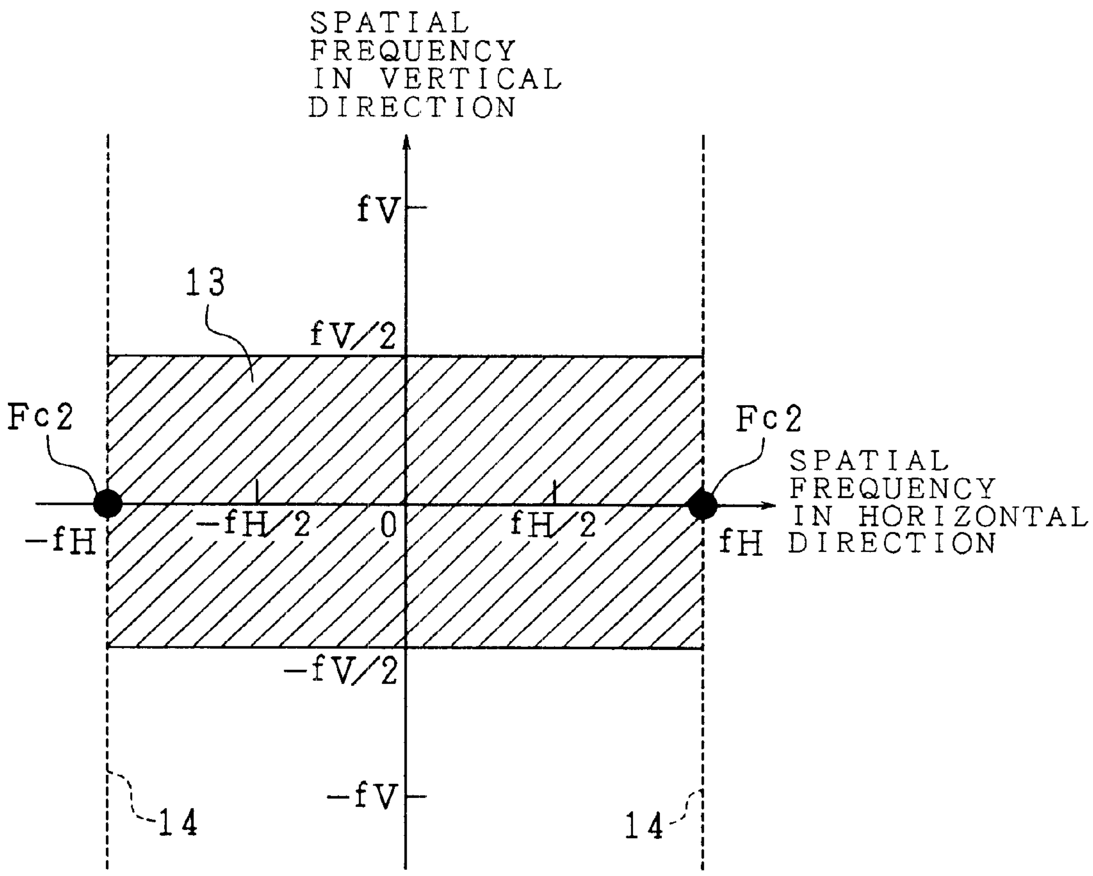
FIG. 8 is a plan view of a spatial frequency indicating the base band of the combined image of Embodiment 2.

Next, an explanation will be given of the LPF 5 in the present embodiment. The LPF 5 is a low-pass filter that is applied to the combined image so as to remove the vertical striped pattern that appears when there is a light-quantity difference between the two original images. FIG. 8 is a graph in which the low-pass characteristic of the LPF 5 and the base band of the combined image are plotted on the spatial-frequency coordinates. The base band 13 is represented by a rectangular region (a hatched region in the drawing) that has the following four points as its apexes.

(fH, fV/2)

(–fH, fV/2)

(–fH, –fV/2)

(fH, –fv/2)

The frequency component of the vertical striped pattern that appears when there is a light-quantity difference between the two original images is located on a border line connecting point (fH, fV/2) and point (fH, –fV/2) and a border line connecting point (-fH, fV/2) and point (–fH, –fV/2).

Therefore, the LPF 5 that is to be applied is desirably set so that the gain on the border lines is zero, and also desirably set so that it has the base band 13 as its pass band. Moreover, in order not to cause distortion in the image after having been subjected to the low-pass process, that is, the combined image after the light-quantity difference correction, the LPF 5 is desirably set so that it has a linear phase characteristic.

Such a low-pass filter that satisfies the above-mentioned requirements tends to become very high in its order. Low-pass filters with a high order tend to take time in processing and require a large circuit scale, thereby failing to meet practical use.

Therefore, a proper order is set by taking into consideration the conditions the low-pass filter must satisfy and the required processing time and circuit scale. For example, low-pass filter r5 that is represented by the following equation (11) is listed.

$$r5 = \frac{1}{64}\begin{bmatrix} 1 & -5 & -5 & 1 \\ -5 & 25 & 25 & -5 \\ -5 & 25 & 25 & -5 \\ 1 & -5 & -5 & 1 \end{bmatrix} \tag{11}$$

This low-pass filter r5 is a two-dimensional low-pass filter that is represented by a matrix having 4 rows and 4 columns. Supposing that a component at row p and column q is represented by r5(p, q), a calculation for carrying out a light-quantity difference correction on the combined image by using low-pass filter r5 is obtained by the following equation (12):

$$t(n, m) = \sum_{p=1}^{4}\sum_{q=1}^{4} s(n+p-2, m+q-2)\cdot r5(p, q) \tag{12}$$

Here, s(n, m) represents a pixel at row n and column m of the combined image before the light-quantity difference correction. Further, t(n, m) represents a pixel at row n and column m of the combined image after the light-quantity difference correction. Low-pass filter r6, which is more simplified than low-pass filter r5, is represented by the following equation (13).

$$r6 = \frac{1}{16}\begin{bmatrix} 1 & 2 & 1 \\ 2 & 4 & 2 \\ 1 & 2 & 1 \end{bmatrix} \tag{13}$$

This low-pass filter r6 is a two-dimensional low-pass filter that is represented by a matrix having 3 rows and 3 columns. Supposing that a component at row p and column q is represented by r6(p, q), a calculation for carrying out a light-quantity difference correction on the combined image by using low-pass filter r6 is obtained by the following equation (14):

$$t(n, m) = \sum_{p=1}^{3}\sum_{q=1}^{3} s(n+p-2, m+q-2)\cdot r6(p, q) \tag{14}$$

The advantage of low-pass filter r6 is that the amount of calculations required is less than that required for low-pass filter r5. However, low-pass filter r6 has such a tendency that the gain of the pass band 13 becomes smaller than 1 as it comes closer to the border lines. The resulting disadvantage is that it has an inferior pass band characteristic as compared with low-pass filter r5, resulting in blurredness in the combined image after the light-quantity difference correction.

Moreover, low-pass filter r7, whose amount of calculations is further reduced, is represented by the following equation (15):

$$r7 = \frac{1}{8}[-1 \quad 5 \quad 5 \quad -1] \tag{15}$$

This low-pass filter r7 is a one-dimensional low-pass filter that is represented by a row vector. Component q is supposed to be represented by r7 (q). A calculation for carrying out a light-quantity difference correction on the combined image by using low-pass filter r7 is obtained by the following equation (16):

$$t(n, m) = \sum_{q=1}^{4} s(n, m+q-2)\cdot r7(q) \tag{16}$$

This low-pass filter r7 low-pass filters the combined image in the image-shift direction as shown in FIG. 6. The frequency component of the striped pattern appearing when there is a light-quantity difference between the two original images is equal to a spatial frequency Fc2 which has a period of two times the directed line segment A2B2 representing the amount of image shift shown in FIG. 6. The spatial frequency Fc2 is a spatial frequency whose direction is the same as the horizontal direction H and which has a value of fH in this direction.

Different from the above-mentioned two-dimensional low-pass filters, low-pass filter r7 is limited so that it cuts off only aportion over a broken line 14 including the spatial frequency Fc2. Even this one-dimensional low-pass filter r7, which deals with the horizontal direction H, can carry out a light-quantity difference correction sufficiently.

Low-pass filter r8, whose amount of calculations is further reduced, is represented by the following equation (17).

$$r8 = \frac{1}{4}[1 \quad 2 \quad 1] \tag{17}$$

This low-pass filter r8 is a one-dimensional low-pass filter that is represented by a row vector. Component q is supposed to berepresented by r8 (q). A calculation for carrying out a light-quantity difference correction on the combined image by using low-pass filter r8 is obtained by the following equation (18):

$$t(n, m) = \sum_{q=1}^{3} s(n, m+q-2)\cdot r8(q) \tag{18}$$

This low-pass filter r8 low-pass filters the combined image in the image-shift direction as shown in FIG. 6. The advantage of low-pass filter r8 is that the amount of calculations required is less than that required for low-pass filter r7. However, low-pass filter r8 has such a tendency that the gain of the pass band 13 becomes smaller than 1 as it comes closer to the broken line 14. The resulting disadvantage is that it has an inferior pass band characteristic as compared with low-pass filter r7, resulting in blurredness in the combined image after the light-quantity difference correction.

As described above, the image pick-up apparatus of the present embodiment carries out a light-quantity difference correction by using a low-pass filter; therefore, it is possible to carry out the process more easily as compared with conventional apparatuses. Further, since the low-pass process is carried out for each pixel, it is possible to properly correct even partial differences in light quantity between the two original images, and consequently to prevent degradation in the output image.

EMBODIMENT 3

The following description will discuss another embodiment of the present invention. Here, the image pick-up apparatus of the present embodiment has a similar construction to the image pick-up apparatuses of Embodiments 1 and 2; therefore, for convenience of explanation, those members that have the same functions and that are described in Embodiments 1 and 2 are indicated by the same reference numerals and the description thereof is omitted.

Different from the aforementioned Embodiments 1 and 2, the image pick-up apparatus of the present embodiment carries out the image shift in the vertical direction V.

Figure 9:
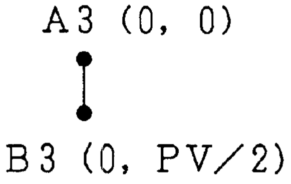
FIG. 9 is an explanatory drawing that shows a positional relationship between the first and second image-forming positions of Embodiment 3.

FIG. 9 is a drawing that indicates a positional relationship between the first and second image-forming positions with respect to imaging light. Based on the first image-forming position A3, the second image-forming position B3 is shifted from the first image-forming position A3 by half the length of the array period PV in the vertical direction V of the light-receiving regions PD.

When imaging light is focused onto the first and second image-forming positions A3 and B3, the charge-coupled device 2 picks up the imaging light and provides the first and second original image signals.

Figure 10:
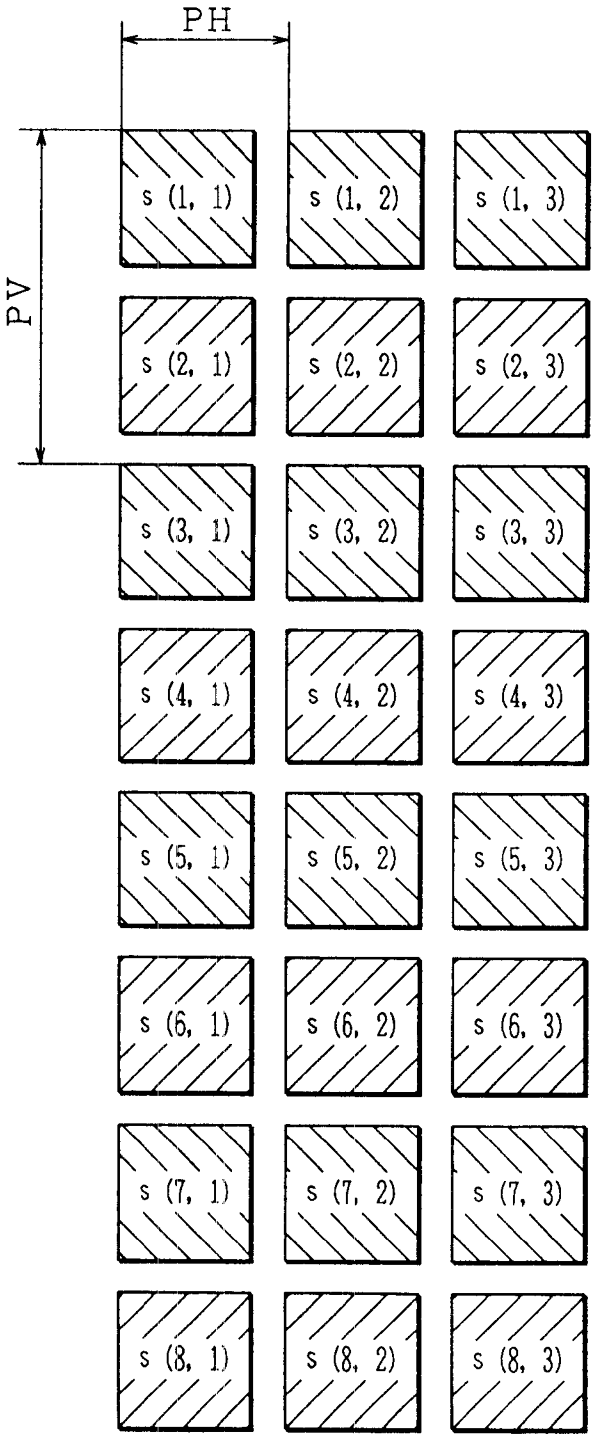
FIG. 10 is an explanatory drawing that shows a combined image constituted by the first and second original images of Embodiment 3.

FIG. 10 is a drawing that indicates a combined image that consists of the first and second original images that represent the original image. Here, those pixels representing the first original image are indicated by hatched portions with lines slanting down to the right, and those pixels representing the second original image are indicated by hatched portions with lines slanting up to the right.

The combined image is produced by superimposing the first and second original images in a manner so as to match spatial positions at the time of the image pick-up. This combining operation is carried out using the image memory 4, by determining addresses to which pieces of pixel data of the first and second original images are alternately stored and storing them in the corresponding addresses. In other words, the combined image is an image in which the first and second original images are superimposed in a manner so as to offset from each other with the same shift length in opposite directions in parallel with the same direction as the aforementioned shift direction of the image-forming positions.

With respect to pixels s(n, m) of the combined image corresponding to the pixels of the first original image, n is an odd number. Further, with respect to pixels s(n, m) of the combined image corresponding to the pixels of the second original image, n is an even number.

With respect to the entire combined image, the actual pixels that are pixels corresponding to either of the first and second original images are arranged in a horizontal striped pattern. Further, in the present embodiment, the pixel arrangements of the combined image and the output image are the same.

The signal-processing section 9 carries out the gamma correction.

The array period of an output image becomes half as long as the pixel array of the first and second original images with respect to the vertical direction. For this reason, supposing that the resolution of the first and second original images is taken as a standard resolution, the resolution of the output image has a higher resolution with respect to the vertical direction V as compared with the standard resolution.

Figure 11:
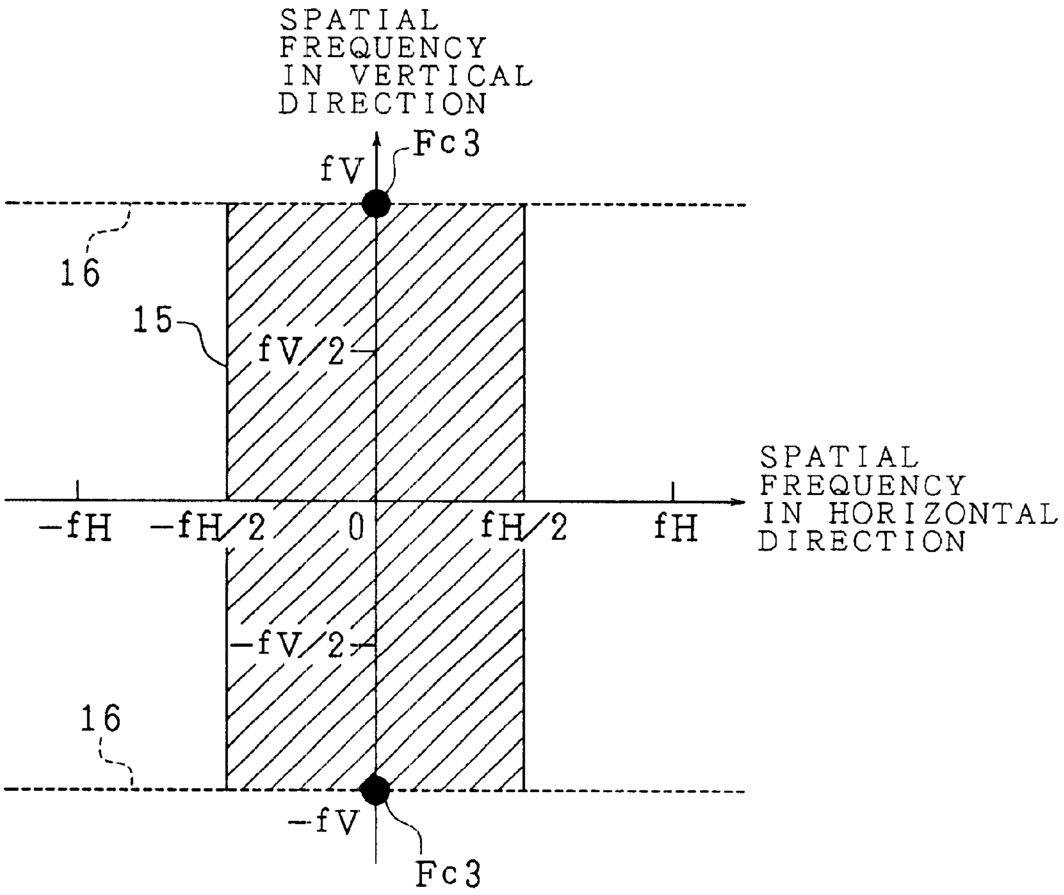
FIG. 11 is a plan view of a spatial frequency indicating the base band of the combined image of Embodiment 3.

Next, an explanation will be given of the LPF 5 in the present embodiment. The LPF 5 is a low-pass filter that is applied to the combined image so as to remove the horizontal striped pattern that appears when there is a light-quantity difference between the two original images. FIG. 11 is a graph in which the low-pass characteristic of the LPF 5 and the base band of the combined image are plotted on the spatial-frequency coordinates. The base band 15 is represented by a rectangular region (a hatched region in the drawing) that has the following four points as its apexes.

(fH/2, fV)

(−fH/2, fV)

(−fH/2, −fV)

(fH/2, -fV)

The frequency component of the horizontal striped pattern that appears when there is a light-quantity difference between the two original images has a period of two times the image-shift amount in the image-shift direction. Therefore, it is located on a border line connecting point (fH/2, fV) and point (−fH/2, fV) and a border line connecting point (−fH/2, −fV) and point (fH/2, −fV).

Therefore, the LPF 5 is desirably set so that the gain on the border lines is zero, and also desirably set so that it has the base band 15 as its pass band. Moreover, in order not to cause distortion in the image after having been subjected to the low-pass process, that is, the combined image after the light-quantity difference correction, the LPF 5 is desirably set so that it has a linear phase characteristic.

Such a low-pass filter that satisfies the above-mentioned requirements tends to become very high in its order. Low-pass filters with a high order tend to take time in processing and require a large circuit scale, thereby failing to meet practical use.

Therefore, a proper order is set by taking into consideration the conditions the low-pass filter must satisfy and the required processing time and circuit scale. For example, low-pass filter r9 that is represented by the following equation (19) is listed.

$$r9 = \frac{1}{64}\begin{bmatrix} 1 & -5 & -5 & 1 \\ -5 & 25 & 25 & -5 \\ -5 & 25 & 25 & -5 \\ 1 & -5 & -5 & 1 \end{bmatrix} \tag{19}$$

This low-pass filter r9 is a two-dimensional low-pass filter that is represented by a matrix having 4 rows and 4 columns. Supposing that a component at row p and column q is represented by r9(p, q), a calculation for carrying out a light-quantity difference correction on the combined image by using low-pass filter r9 is obtained by the following equation (20)

$$t(n, m) = \sum_{p=1}^{4}\sum_{q=1}^{4} s(n+p-2, m+q-2)\cdot r9(p, q) \tag{20}$$

Here, s(n, m) represents a pixel at row n and column m of the combined image before the light-quantity difference correction. Further, t(n, m) represents a pixel at row n and column m of the combined image after the light-quantity difference correction. Low-pass filter r10, which is more simplified than low-pass filter r9, is represented by the following equation (21).

$$r10 = \frac{1}{16}\begin{bmatrix} 1 & 2 & 1 \\ 2 & 4 & 2 \\ 1 & 2 & 1 \end{bmatrix} \quad (21)$$

This low-pass filter r10 is a two-dimensional low-pass filter that is represented by a matrix having 3 rows and 3 columns. Supposing that a component at row p and column q is represented by r10 (p, q), a calculation for carrying out a light-quantity difference correction on the combined image by using low-pass filter r10 is obtained by the following $$t(n, m) = \sum_{p=1}^{3}\sum_{q=1}^{3} s(n+p-2, m+q-2)\cdot r10(p, q) \quad (22)$$

The advantage of low-pass filter r10 is that the amount of calculations required is less than that required for low-pass filter r9. However, low-pass filter r10 has such a tendency that the gain of the pass band 15 becomes smaller than 1 as it comes closer to the border lines. The resulting disadvantage is that it has an inferior pass band characteristic as compared with low-pass filter r9, resulting in blurredness in the combined image after the light-quantity difference correction.

Moreover, low-pass filter r11, whose amount of calculations is further reduced, is represented by the following equation (23):

$$r11 = \frac{1}{8}\begin{bmatrix} -1 \\ 5 \\ 5 \\ -1 \end{bmatrix} \quad (23)$$

This low-pass filter r11 is a one-dimensional low-pass filter that is represented by a column vector. Component p is supposed to be represented by r11 (p). A calculation for carrying out a light-quantity difference correction on the combined image by using low-pass filter r11 is obtained by the following equation (24):

$$t(n, m) = \sum_{p=1}^{4} s(n+p-2, m)\cdot r11(p) \quad (24)$$

This low-pass filter r11 low-pass filters the combined image in the image-shift direction as shown in FIG. 9. The frequency component of the striped pattern appearing when there is a light-quantity difference between the two original images is equal to a spatial frequency Fc3 which has a period of two times the directed line segment A3B3 representing the amount of image shift shown in FIG. 9. The spatial frequency Fc3 is a spatial frequency whose direction is the same as the vertical direction V and which has a value of fV in this direction.

Different from the above-mentioned two-dimensional low-pass filters, low-pass filter r11 is limited so that it cuts off only a portion over a broken line 16 including the spatial frequency Fc3. Even this one-dimensional low-pass filter r11, which deals with the vertical direction V, can carry out a light-quantity difference correction sufficiently.

Low-pass filter r12, whose amount of calculations is further reduced, is represented by the following equation (25).

$$r12 = \frac{1}{4}\begin{bmatrix} 1 \\ 2 \\ 1 \end{bmatrix} \quad (25)$$

This low-pass filter r12 is a one-dimensional low-pass filter that is represented by a column vector. Component p is supposed to be represented by r12 (p). A calculation for carrying out a light-quantity difference correction on the combined image by using low-pass filter r12 is obtained by the following equation (26):

$$t(n, m) = \sum_{p=1}^{3} s(n+p-2, m)\cdot r12(p) \quad (26)$$

This low-pass filter r12 low-pass filters the combined image in the image-shift direction as shown in FIG. 9. The advantage of low-pass filter r12 is that the amount of calculations required is less than that required for low-pass filter r11. However, low-pass filter r12 has such a tendency that the gain of the pass band 15 becomes smaller than 1 as it comes closer to the broken line 16. The resulting disadvantage is that it has an inferior pass band characteristic as compared with low-pass filter r11, resulting in blurredness in the combined image after the light-quantity difference correction.

Consequently, also in the present embodiment, it is possible to carry out a light-quantity difference correction between two original images by using a simple process. Further, since the low-pass process is carried out for each pixel, it is possible to properly correct even partial differences in light quantity between the two original images, and consequently to prevent degradation in the output image.

In the above-mentioned Embodiments 1 through 3, explanations were given of image pick-up apparatuses by assuming that those apparatuses pick up monochromatic images. However, the present invention can be applied not only to image pick-up apparatuses for picking up monochromatic images, but also to those apparatuses for picking up color images. That is, as in the case of image pick-up apparatuses for picking up monochromatic images, the present invention can be applied to those apparatuses for picking up color images so as to carry out a light-quantity difference correction. In the following Embodiment 4, an explanation will be given of a color image pick-up apparatus for picking up color images.

EMBODIMENT 4

The following description will discuss still another embodiment of the present invention. Here, for convenience of explanation, those members that have the same functions and that are described in the aforementioned Embodiments are indicated by the same reference numerals and the description thereof is omitted.

The image pick-up apparatus of the present embodiment is a color image pick-up apparatus for picking up color images. There are, for example, two types of color image pick-up apparatuses, that is, a single-plate system and a three-plate system. In an image pick-up apparatus of the single-plate system, a color filter, which regulates the wavelength of light to be received by the respective light-receiving regions, is placed on the light-incident side of the charge-coupled device, and light that has passed through the filter is picked up.

In an image pick-up apparatus of the three-plate system, imaging light is separated by a color-separation prism into monochromatic imaging light rays of three primary colors, that is, red, blue and green, and the charge-coupled devices pick up these monochromatic imaging light rays separately. Therefore, the image pick-up apparatus of the three-plate system has three charge-coupled devices.

In the LPF 5 of the present embodiment, image signals derived from the respective monochromatic imaging light rays, obtained by the image pick-up apparatus of the single-plate system or the three-plate system, are treated as signals having vector quantities indicating respective color hues of, for example, the three primary colors, red, green and blue (where the number of types u of image data per one imaging light is 3), and a low-pass filtering process is carried out individually on each monochromatic-imaging-light image signal.

Alternatively, the LPF 5 produces a. luminance signal and color-difference signals of two types from the color image signal (where the number of types u of image data per one imaging light is 3), and a low-pass filtering process is carried out individually on each of the luminance signal and the color-difference signals.

Thus, it is possible to correct the light-quantity difference of the output image also in a color image pick-up apparatus.

The data, which has been subjected to the above-mentioned low-pass filtering process, interpolated by the signal processing section 9, and then recorded in the recording medium 10. The data, recorded in the recording medium 10, may be individual signals that have been individually processed by the LPF 5, or may be a combined signal of these signals.

The following description will discuss a specific example of a color image pick-up apparatus of the single-plate system, as the image pick-up apparatus in accordance with the present embodiment. Here, since the construction of the structural elements of the image pick-up apparatus of the present embodiment is virtually the same as that of the image pick-up apparatus of Embodiment 1, the same structural elements are indicated by the same reference numerals and the description thereof is omitted.

Figure 12:
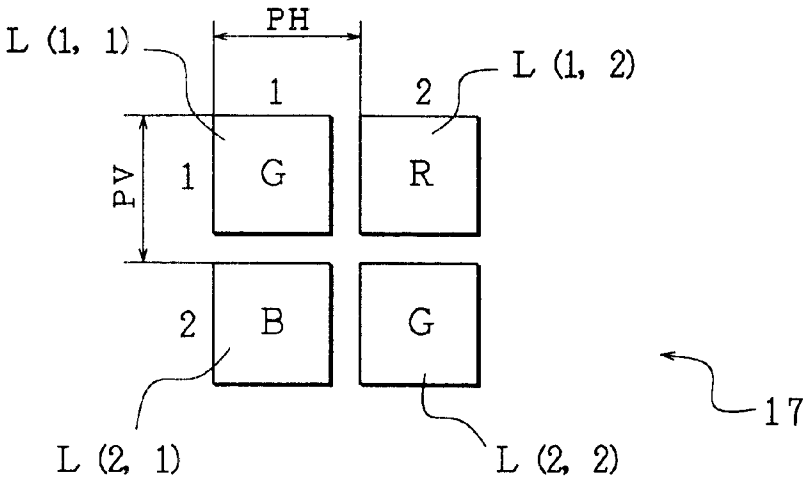
FIG. 12 is an explanatory drawing that shows a basic array pattern of a color array of transmitting regions of color filters of Embodiment 4.

FIG. 12 is a drawing that shows a basic array pattern 17 of color arrangements of light-transmitting regions of a color filter. The basic array pattern 17 consists of four light-transmitting regions L that are arranged with 2 rows and 2 columns. In this pattern 17, two light-transmitting regions L are provided for green, and one light-transmitting region is provided for each of red and blue. In the basic array pattern 17, light-transmitting regions L (1, 1) and (2, 2) are green light-transmitting regions L. Light-transmitting region (1, 2) is red light-transmitting region L. Light-transmitting region (2, 1) is blue light-transmitting region.

The color filter is formed by periodically repeating this basic array pattern 17 in the vertical direction and the horizontal direction.

The charge-coupled device 2 picks up imaging light that is focused through this filter, and outputs the resulting original image signals. The arrangement of pixels of each of the original image signal and the relative relationship between the pixels and light-receipt data are equivalent to the array of the light-transmitting regions L of the color filter of FIG. 12, and each corresponding pixel has light-receipt data of a monochromatic ray.

Figure 13:
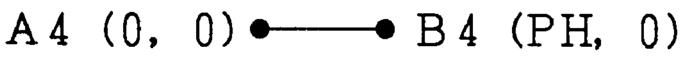
FIG. 13 is an explanatory drawing that shows a positional relationship between the first and second image-forming positions of Embodiment 4.

The image-picking up operation of the imaging light of the image pick-up apparatus is similar to the image picking up operation of the imaging light of Embodiment 1, and the behaviors of the optical system 1, the charge-coupled device 2, the A/D converter 3 and the image memory 4 are the same as those of Embodiment 1. In this case, as illustrated in FIG. 13, the image shift is made so that the image-forming position of the imaging light is shifted to the first and second image-forming positions A4 and B4 that are apart from each other with a gap PH in the horizontal direction H. In the present embodiment, the resolution in the horizontal direction is improved by the image shift in the horizontal direction.

The signal-processing section 9 of the image pick-up apparatus of the present embodiment first produces a combined image signal from the first and second original image signals. The combined image is constituted by "M×N" number of corresponding pixels that are arranged with M rows and N columns. The array periods of pixels of the combined image in the horizontal and vertical directions H and v are respectively represented by periods PH and PV. The corresponding pixels have light-receipt data representative of color light rays of two types different from each other.

Figure 14:
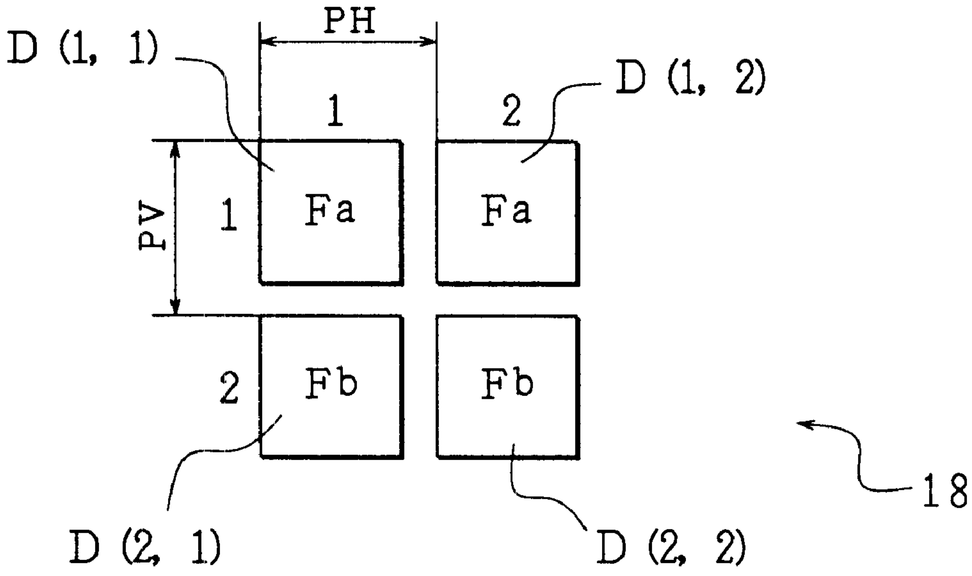
FIG. 14 is an explanatory drawing that shows a basic array pattern of a pixel array that is equivalent to a combined image represented by a combined image signal of Embodiment 4.

FIG. 14 is a drawing that shows a basic array pattern 18 of the array of pixels D that are equivalent to a combined image that is represented by the combined image signal. The basic array pattern 18 is constituted by four pixels that are arranged with 2 rows and 2 columns. Pixels D (1, 1) and D (1, 2) are pixels related to green and red. Pixels D (2, 1) and D (2, 2) are pixels related to green and blue.

In FIG. 14, those pixels related to green and red are represented by a symbol "Fa" and those pixels related to green and blue are represented by a symbol "Fb". This shows that the combined image has a pixel array that is equivalent to the pixel array of the original image, and all the pixels thereof are related to green.

Moreover, those pixels on odd rows are red-related pixels, and those pixels on even rows are virtual pixels for red having no red-related pixels. Those pixels on even rows are blue-related pixels, and those pixels on odd rows are virtual pixels for blue having no blue-related pixels.

Figure 15:
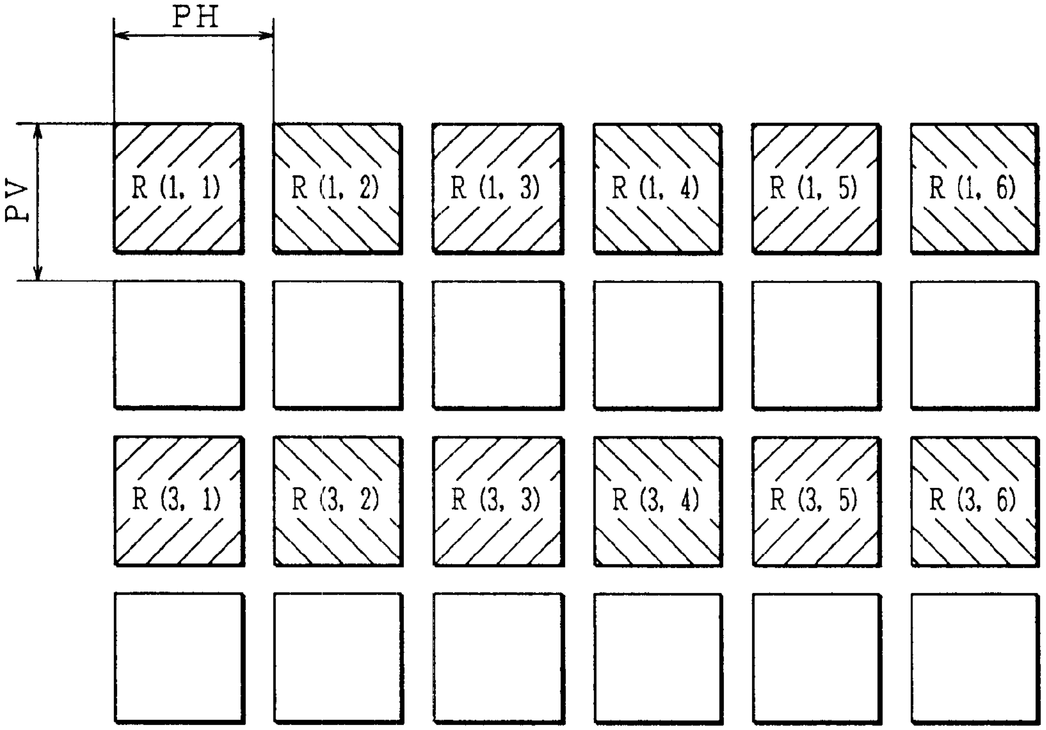
FIG. 15 is an explanatory drawing that shows an array of red pixels of a combined image of Embodiment 4.
Figure 16:
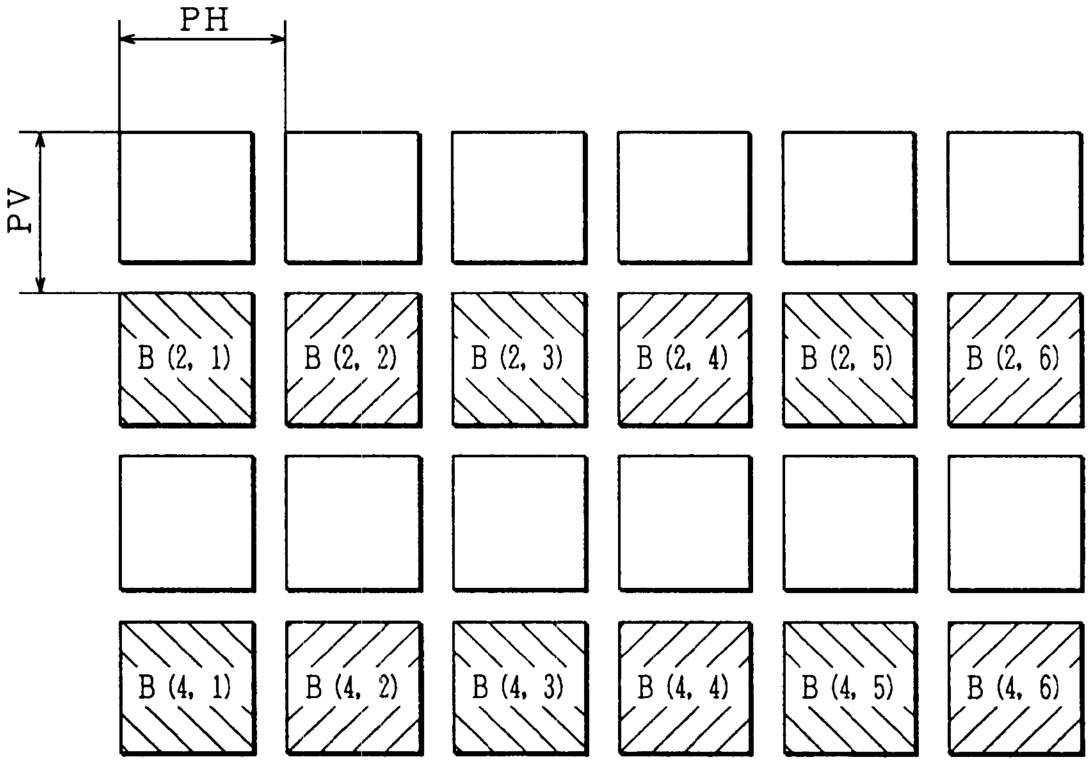
FIG. 16 is an explanatory drawing that shows an array of blue pixels of the combined image of Embodiment 4.
Figure 17:
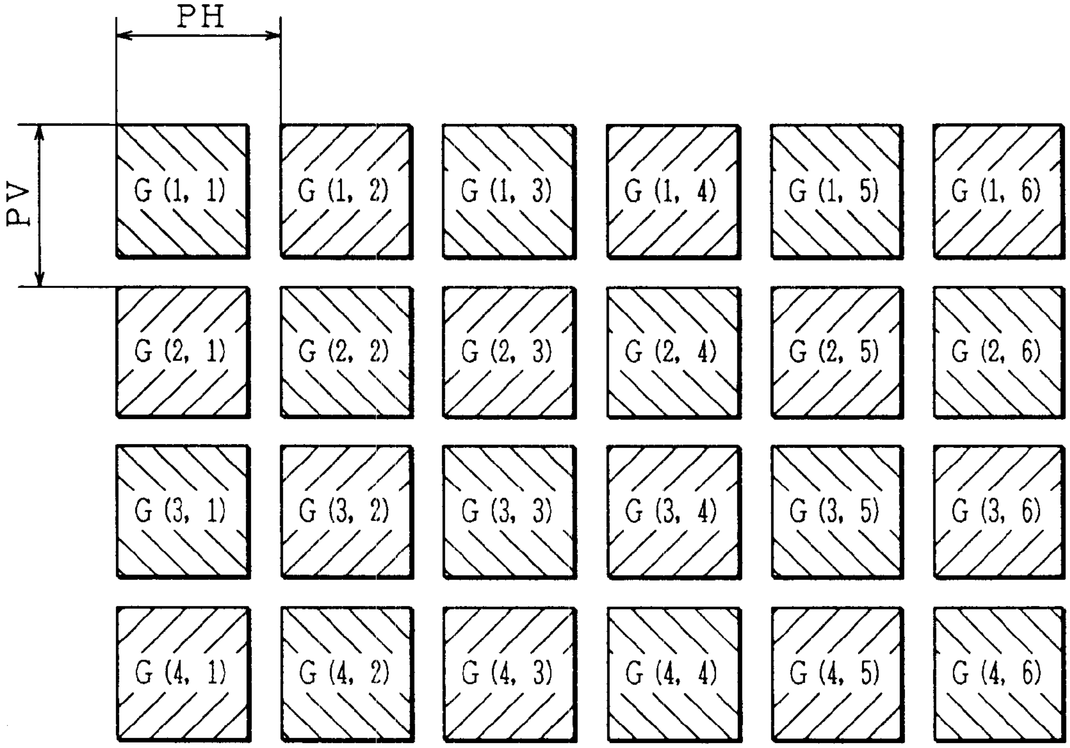
FIG. 17 is an explanatory drawing that shows an array of green pixels of the combined image of Embodiment 4.

FIGS. 15, 16 and 17 show arrays of combined images that are individually related to red, blue and green. FIG. 15 shows the array of red. FIG. 16 shows the array of blue. FIG. 17 shows the array of green. The pixels of the first original image are indicated by hatched portions with lines slanting down to the right, and the pixels of the second original image are indicated by hatched portions with lines slanting up to the right.

Next, an explanation will be given of the LPF 5 which is installed in the image pick-up device in the present embodiment and which forms a feature of the present invention.

Figure 18:
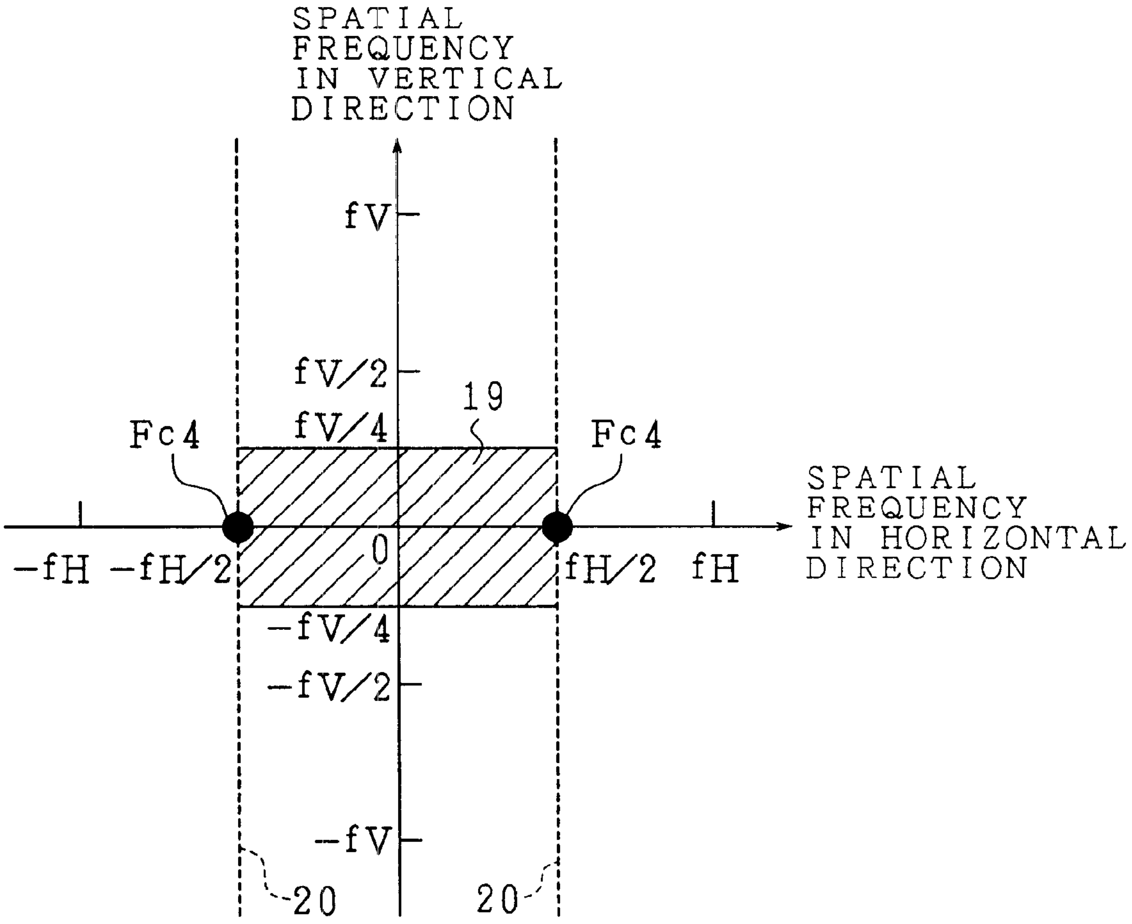
FIG. 18 is a plan view of a spatial frequency that indicates a base band in the case of the array of red or blue of Embodiment 4.

The LPF 5 of the present embodiment individually carries out a low-pass filtering operation on the respective imaging signals of monochromatic imaging light rays. FIG. 18 is a graph in which the low-pass characteristic of the LPF 5 and the base band related to the red or blue pixels of the combined image are plotted on the spatial-frequency coordinates. The base band 19 is represented by a rectangular region (a hatched region in the drawing) that has the following four points as its apexes.

$(fH/2, fV/4)$ $(-fH/2, fV/4)$ $(-fH/2, -fV/4)$ $(fH/2, -fV/4)$

The frequency component of the vertical striped pattern that appears when there is a light-quantity difference between the two original images has a period of two times the image-shift amount in the image-shift direction.

Therefore, the frequency component is located on a border line connecting point (fH/2, fV/4) and point (fH/2, −fV/4) and a border line connecting point (−fH/2, fV/4) and point (−fH/2, −fV/4).

Therefore, the LPF 5 is desirably set so that the gain on the border lines is zero, and also desirably set so that it has the base band 19 as its pass band. Moreover, in order not to cause distortion in the image after having been subjected to the low-pass process, that is, the combined image after the light-quantity difference correction, the LPF 5 is desirably set so that it has a linear phase characteristic.

Such a low-pass filter that satisfies the above-mentioned requirements tends to become very high in its order. Low-pass filters with a high order tend to take time in processing and require a large circuit scale, thereby failing to meet practical use.

Therefore, a proper order is set by taking into consideration the conditions the low-pass filter must satisfy and the required processing time and circuit scale. For example, low-pass filter r13 that is represented by the following equation (27) is listed.

$$r13 = \frac{1}{64}\begin{bmatrix} 1 & -5 & -5 & 1 \\ 0 & 0 & 0 & 0 \\ -5 & 25 & 25 & -5 \\ 0 & 0 & 0 & 0 \\ -5 & 25 & 25 & -5 \\ 0 & 0 & 0 & 0 \\ 1 & -5 & -5 & 1 \end{bmatrix} \tag{27}$$

This low-pass filter r13 is a two-dimensional low-pass filter that is represented by a matrix having 7 rows and 4 columns. Supposing that a component at row p and column q is represented by r13 (p, q), a calculation for carrying out a light-quantity difference correction on the combined image by using low-pass filter r13 is obtained by the following equation (28):

$$t(n, m) = \sum_{p=1}^{7} \sum_{q=1}^{4} s(n + p - 3, m + q - 2) \cdot r13(p, q) \tag{28}$$

Here, s(n, m) represents a red or blue pixel at row n and column m of the combined image before the light-quantity difference correction. As shown in FIGS. 15 and 16, the virtual pixels have no pixel data. The calculation of equation (28) is carried out, supposing that the pixel data of each virtual pixel is zero. Further, t(n, m) represents a red or blue pixel at row n and column m of the combined image after the light-quantity difference correction. When s(n, m) which is a virtual pixel is calculated by the above-mentioned equation (28), the pixel value of pixel t(n, m) becomes zero after the light-quantity difference correction. Therefore, calculations related to the virtual pixels are omitted with respect to equation (28).

Low-pass filter r14, which is more simplified than low-pass filter r13, is represented by the following equation (29).

$$r14 = \frac{1}{16}\begin{bmatrix} 1 & 2 & 1 \\ 0 & 0 & 0 \\ 2 & 4 & 2 \\ 0 & 0 & 0 \\ 1 & 2 & 1 \end{bmatrix} \tag{29}$$

This low-pass filter r14 is a two-dimensional low-pass filter that is represented by a matrix having 5 rows and 3 columns. Supposing that a component at row p and column q is represented by r14 (p, q), a calculation for carrying out a light-quantity difference correction on the combined image by using low-pass filter r14 is obtained by the following equation (30):

$$t(n, m) = \sum_{p=1}^{5} \sum_{q=1}^{3} s(n + p - 3, m + q - 2) \cdot r14(p, q) \tag{30}$$

The advantage of low-pass filter r14 is that the amount of calculations required is less than that required for low-pass filter r13. However, low-pass filter r14 has such a tendency that the gain of the pass band 19 becomes smaller than 1 as it comes closer to the border lines. The resulting disadvantage is that it has an inferior pass band characteristic as compared with low-pass filter r13, resulting in blurredness in the combined image after the light-quantity difference correction.

Moreover, low-pass filter r15, whose amount of calculations is further reduced, is represented by the following equation (31):

$$r15 = \frac{1}{8}[-1 \quad 5 \quad 5 \quad -1] \tag{31}$$

This low-pass filter r15 is a one-dimensional low-pass filter that is represented by a row vector. Supposing that a component at column q is represented by r15 (q), a calculation for carrying out a light-quantity difference correction on the combined image by using low-pass filter r15 is obtained by the following equation (32):

$$t(n, m) = \sum_{q=1}^{4} s(n, m + q - 2) \cdot r15(q) \tag{32}$$

This low-pass filter r15 low-pass filters the combined image in the image-shift direction as shown in FIG. 13. As described earlier, the frequency component of the vertical striped pattern appearing when there is a light-quantity difference between the two original images is equal to the spatial frequency Fc4 which has a period of two times the directed line segment A4B4 representing the amount of image shift shown in FIG. 13. The spatial frequency Fc4 is a spatial frequency whose direction is equal to the horizontal direction H and which has a value of fH in this direction. Different from the above-mentioned two-dimensional low-pass filter, low-pass filter r15 is limited so that it cuts off only a portion over a broken line 20 including the spatial frequency Fc4. Even this low-pass filter r15, which deals with the horizontal direction H, can carry out a light-quantity difference correction sufficiently.

Low-pass filter r16, whose amount of calculations is further reduced, is represented by the following equation (33).

$$r16 = \frac{1}{4}[1 \quad 2 \quad 1] \tag{33}$$

This low-pass filter r16 is a one-dimensional low-pass filter that is represented by a row vector. Supposing that a component at q is represented by r16 (q), a calculation for carrying out a light-quantity difference correction on the combined image by using low-pass filter r16 is obtained by the following equation (34):

$$t(n, m) = \sum_{q=1}^{3} s(n, m + q - 2) \cdot r16(q) \tag{34}$$

This low-pass filter r16 low-pass filters the combined image in the image-shift direction as shown in FIG. 13. The advantage of low-pass filter r16 is that the amount of calculations required is less than that required for low-pass filter r15. However, low-pass filter r16 has such a tendency that the gain of the pass band 19 becomes smaller than 1 as it comes closer to the broken line 20. The resulting disadvantage is that it has an inferior pass band characteristic as compared with low-pass filter r15, resulting in blurredness in the combined image after the light-quantity difference correction.

Figure 19:
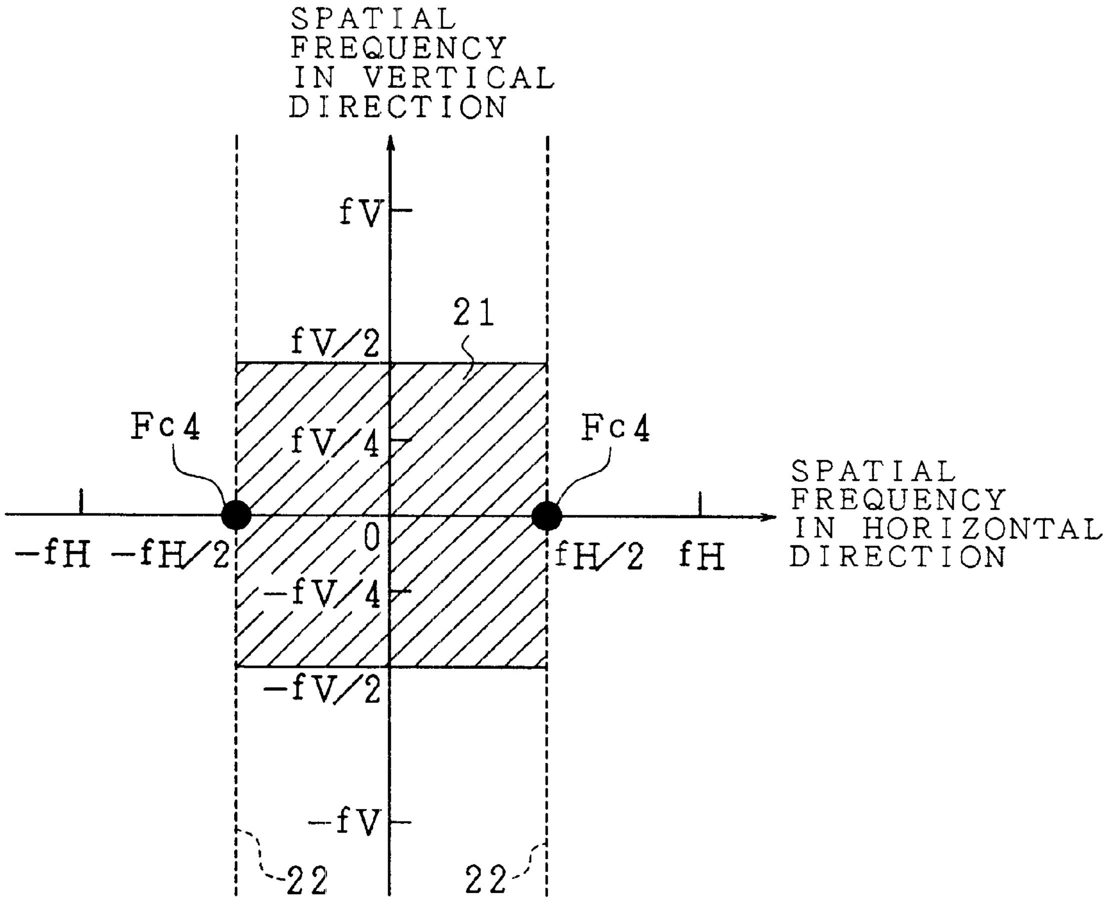
FIG. 19 is a plan view of a spatial frequency that indicates a base band in the case of the array of green of Embodiment 4.

Next, an explanation will be given of the pixels related to green in the combined image. FIG. 19 is a graph which shows the base band related to the green pixels. The LPF 5 has a pass band 21 represented by a rectangular region (a hatched region in the drawing) that has the following four points as its apexes.

(fH/2, fV/2)

(−fH/2, fV/2)

(−fH/2, −fV/2)

(fH/2, −fV/2)

The frequency component of the diced pattern that appears when there is a light-quantity difference between the two original images has a period of two times the shift amount of the image shift in the image-shift direction. Therefore, the frequency component is located on a border line connecting point (fH/2, fV/2) and point (fH/2, −fV/2) and a border line connecting point (−fH/2, fV/2) and point (−fH/2, −fV/2)

Therefore, the LPF 5 is desirably set so that the gain is zero on the border line. Moreover, in order not to cause distortion in the image after having been subjected to the low-pass process, that is, the combined image after the light-quantity difference correction, the LPF 5 is desirably set so that it has a linear phase characteristic.

Such a low-pass filter that satisfies the above-mentioned requirements tends to become very high in its order. Low-pass filters with a high order tend to take time in processing and require a large circuit scale, thereby failing to meet practical use.

Therefore, a proper order is set by taking into consideration the conditions the low-pass filter must satisfy and the required processing time and circuit scale. For example, low-pass filter r17 that is represented by the following equation (35) is listed.

$$r17 = \frac{1}{64}\begin{bmatrix} 1 & -5 & -5 & 1 \\ -5 & 25 & 25 & -5 \\ -5 & 25 & 25 & -5 \\ 1 & -5 & -5 & 1 \end{bmatrix} \tag{35}$$

This low-pass filter r17 is a two-dimensional low-pass filter that is represented by a matrix having 4 rows and 4 columns. Supposing that a component at row p and column q is represented by r17 (p, q), a calculation for carrying out a light-quantity difference correction on the combined image by using low-pass filter r17 is obtained by the following equation (36):

$$t(n, m) = \sum_{p=1}^{4}\sum_{q=1}^{4} G(n + p - 2, m + q - 2) \cdot r17(p, q) \tag{36}$$

Here, G(n, m) represents a green pixel at row n and column m of the combined image before the light-quantity difference correction. Further, t(n, m) represents a green pixel at row n and column m of the combined image after the light-quantity difference correction.

Low-pass filter r18, which is more simplified than low-pass filter r17, is represented by the following equation (37).

$$r18 = \frac{1}{16}\begin{bmatrix} 1 & 2 & 1 \\ 2 & 4 & 2 \\ 1 & 2 & 1 \end{bmatrix} \tag{37}$$

This low-pass filter r18 is a two-dimensional low-pass filter that is represented by a matrix having 3 rows and 3 columns. Supposing that a component at row p and column q is represented by r18 (p, q), a calculation for carrying out a light-quantity difference correction on the combined image by using low-pass filter r18 is. obtained by the following equation (38):

$$t(n, m) = \sum_{p=1}^{3}\sum_{q=1}^{3} G(n + p - 2, m + q - 2) \cdot r18(p, q) \tag{38}$$

The advantage of low-pass filter r18 is that the amount of calculations required is less than that required for low-pass filter r17. However, low-pass filter r18 has such a tendency that the gain of the pass band 21 becomes smaller than 1 as it comes closer to the border lines. The resulting disadvantage is that it has an inferior pass band characteristic as compared with low-pass filter r17, resulting in blurredness in the combined image after the light-quantity difference correction.

Moreover, low-pass filter r19, whose amount of calculations is further reduced, is represented by the following equation (39):

$$r19 = \frac{1}{8}[-1 \quad 5 \quad 5 \quad -1] \tag{39}$$

This low-pass filter r19 is a one-dimensional low-pass filter that is represented by a row vector. Component q is supposed to be represented by r19 (q). A calculation for carrying out a light-quantity difference correction on the combined image by using low-pass filter r19 is obtained by the following equation (40):

$$t(n,m)=\sum_{q=1}^{4} G(n,m+q-2)\cdot r19(q) \quad (40)$$

This low-pass filter r19 low-pass filters the combined image in the image-shift direction as shown in FIG. 13.

The frequency component of the diced pattern appearing when there is a light-quantity difference between the two original images is equal to a spatial frequency Fc4 which has a period of two times the directed line segment A4B4 representing the amount of image shift shown in FIG. 13. The spatial frequency Fc4 is a spatial frequency whose direction is the same as the horizontal direction H and which has a value of fH in this direction.

Different from the above-mentioned two-dimensional low-pass filters, low-pass filter r19 is limited so that it cuts off only a portion over a broken line 22 including the spatial frequency Fc4. Even this one-dimensional low-pass filter r19, which deals with the horizontal direction H, can carry out a light-quantity difference correction sufficiently.

Low-pass filter r20, whose amount of calculations is further reduced, is represented by the following equation (41).

$$r20=\frac{1}{4}[1\ \ 2\ \ 1] \quad (41)$$

This low-pass filter r20 is a one-dimensional low-pass filter that is represented by a row vector. Component q is supposed to be represented by r20 (q). A calculation for carrying out a light-quantity difference correction on the combined image by using low-pass filter r20 is obtained by the following equation (42):

$$t(n,m)=\sum_{q=1}^{3} G(n,m+q-2)\cdot r20(q) \quad (42)$$

This low-pass filter r20 low-pass filters the combined image in the image-shift direction as shown in FIG. 13. The advantage of low-pass filter r20 is that the amount of calculations required is less than that required for low-pass filter r19. However, low-pass filter r20 has such a tendency that the gain of the pass band 11 becomes smaller as it comes closer to the broken line 22. The resulting disadvantage is that it has an inferior pass band characteristic as compared with low-pass filter r19, resulting in blurredness in the combined image after the light-quantity difference correction.

As described above, in the present embodiment, the spatial frequency Fc4 that appears when there is a light-quantity difference between the two original images is a spatial frequency in the horizontal direction. However, as can be seen by the green pixel array in FIG. 17, a diced pattern appears when there is a light-quantity difference in the green pixels. The low-pass filter for removing this diced pattern may be provided as a one-dimensional low-pass filter in the vertical direction.

Since the objective of the present embodiment is to carry out an image shift so as to improve the resolution in the horizontal direction, to carry out a low-pass filtering in the horizontal direction goes against the objective. Therefore, in the present embodiment it is more preferable to provide a one-dimensional low-pass filter in the vertical direction.

Moreover, since the low-pass filter is applied to each of the pixels, the light-quantity-difference correction can be carried out on any portion of the image, even when light-quantity differences vary depending on portions.

Additionally, in the aforementioned embodiments 2 through 4, in the same manner as the above-mentioned embodiment 1, (1) after producing a combined image by combining two original image signals, (2) the resulting combined image is subjected to a low-pass filtering process, and (3) the signal-processing section 9 finds the image data of virtual pixels by interpolation; however, this processing sequence is not limited by this order, and the low-pass filtering process may be carried out after finding the image data of the virtual pixels (see Embodiment 5 which will be described later) or the low-pass filtering process and the interpolation may be carried out at the same time.

EMBODIMENT 5

The following description will discuss another embodiment of the present invention.

Figure 20:
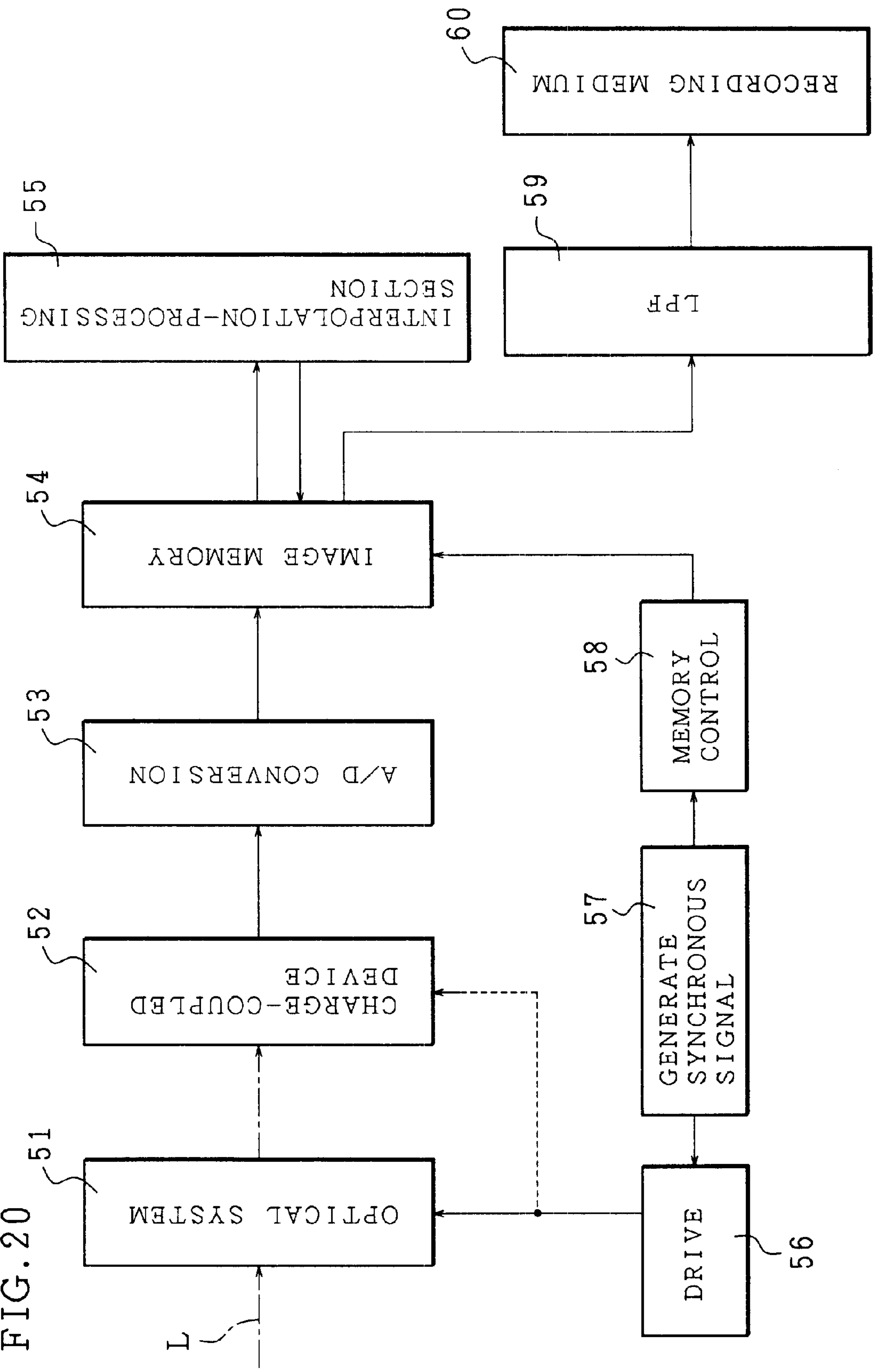
FIG. 20 is a schematic block diagram that shows a structural example of an image pick-up apparatus of Embodiment 5.

As illustrated in FIG. 20, an image pick-up apparatus of the present embodiment is provided with an optical system 51, a charge-coupled device 52, an A/D converter 53, an image memory 54, an interpolation-processing section 55, a driving section 56, a synchronous-signal generating section 57, a memory control section 58, an LPF 59 and a recording medium 60.

In the image pick-up apparatus having the above-mentioned arrangement, imaging light from a subject is converged by a light-converging lens of the optical system 51, and then focused onto the image-forming surface of the charge-coupled device 52. A plurality of light-receiving regions PD are arranged in the matrix format on the image-forming surface of the charge-coupled device 52.

Besides the light-converging lens for converging imaging light, the optical system 51 has an image-shift mechanism. The image-shift mechanism is driven by the driving section 56 so that it allows the image-forming position of the imaging light to shift to first and second image-forming positions on the image-forming surface every predetermined time.

The charge-coupled device 52 allows the respective light-receiving regions PD to receive the imaging light from the optical system 51 for a predetermined exposing time so that the imaging light is picked up. After the lapse of exposing time, the charge-coupled device 52 transfers light-receipt data from the respective light-receiving regions PD to the A/D converter 53 as the first or second original image signal every predetermined time.

The A/D converter 53 converts the first and second original image signals that are analog signals from the charge-coupled device 52 into digital signals, and stores them in the image memory 54.

The synchronous-signal generating section 57 generates a synchronous signal that corresponds to the picking-up operation of the two original image signals, and sends this signal to the driving section 56 and the memory control section 58.

The driving section 56 carries out the image-shift operation by using the image-shift mechanism in the optical system 51. Thus, in the charge-coupled device 52, imaging light, which is to be received by the light-receiving regions PD, is offset from the imaging light before the shift in the image of the subject.

The memory control section 58 stores the light-receipt data in the image memory 54, while making them associated with each other for each of the two original image signals having different image-forming positions.

The interpolation-processing section 55 receives the original image signals from the image memory 54, and produces image data that can not be obtained by the two original image signals by using interpolation. In other words, upon combining the two original image signals, it produces image data for pixels that have no data by the interpolation. Then, the resulting image signal after the interpolation is again stored in the image memory 54. Here, the original image signals, stored in the image memory 4, are overwritten by the signal after the interpolation, and thereby erased by the interpolation-processing section 55.

The LPF 59, which is a low-pass filter for eliminating degradation of the image quality that appears due to a light-quantity difference between the two original image signals and the interpolating operation, receives the original image signal that is stored in the image memory 54 after having been subjected to the interpolating operation, and carries out the image-quality correction (the light-quantity difference correction and the interpolation correction). The resulting signal after the image-quality correction is stored in the recording medium 60 as an output image signal.

Next, an explanation will be given of a specific example of the image pick-up apparatus of the present embodiment. In the charge-coupled device 52, the pixel array of the image-forming surface having a construction shown in FIG. 2 is periodically repeated in the horizontal and vertical directions H and V, and the positional relationship of the first and second image-forming positions of imaging light is supposed to be shown in FIG. 3. Based on the first image-forming position A1, the second image-forming position B1 is shifted from the first image-forming position A1 by half the length of the array period PH in the horizontal direction H and by half the length of the array period PV in the vertical direction V of the light-receiving regions PD.

When imaging light is focused onto the first and second image-forming positions A1 and B1, the charge-coupled device 52 picks up the imaging light and provides the first and second original image signals. FIG. 4 is a drawing that indicates a combined image. Those pixels representing the first original image are indicated by hatched portions with lines slanting down to the right, and those pixels representing the second original image are indicated by hatched portions with lines slanting up to the right. Here, the operation is carried out in the same manner as the image pick-up apparatus of Embodiment 1 in FIG. 1.

The interpolation-processing section 55 carries out an interpolation from the pixel data of actual pixels surrounding a pixel having no data (virtual pixel) so as to produce pixel data thereof in the combined image, and produces pixel data of the virtual pixel by substitution.

In this interpolating process, for example, the linear interpolation method or the cubic convolution interpolation method is adopted.

In the linear interpolation method, the pixel data of a virtual pixel is interpolated by using, for example, the average value of the pixel data of the four actual pixels surrounding the virtual pixel in the combined image.

In the cubic convolution interpolation method, the pixel data of a virtual pixel is interpolated by using the pixel data of 16 actual pixels surrounding the virtual pixel.

The array period of the image after the interpolation becomes half as long as the pixel array of the first and second original image with respect to any of the horizontal and vertical directions. For this reason, supposing that the resolution of the first and second original images is taken as a standard resolution, the resolution of the output image has a higher resolution with respect to any of the directions H and V as compared with the standard resolution. The array period of the output image with respect to the pixels in the diagonal direction U becomes half as long as the array period of the combined image. However, the output image signal is obtained by interpolating the combined image signal. Even if the array period of the pixels of the output image becomes smaller than that of the combined image due to pixels that have been increased by the interpolating process, the resolution has no difference from that of the combined image. Therefore, the resolution of the output image in the diagonal direction U is reduced as compared with the resolution that is supposed to be obtained by the array period of the pixels.

Next, an explanation will be given of the LPF 59 which carries out a light-quantity difference correction that is a feature of the present invention.

The LPF 59 applies a low-pass filtering operation to the combined image that has been subjected to the interpolation so as to remove the diced pattern that appears when there is a light-quantity difference between the two original images and the diced pattern resulted from the interpolation.

FIG. 5 is a graph in which the low-pass characteristic of the LPF 59 and the base band of the combined image are plotted on the spatial-frequency coordinates. The base band 11 is represented by a rectangular region (a hatched region in the drawing) that has the following four points as its apexes.

(fH, 0)

(0, fV)

(−fH, 0)

(0, −fV)

Here, for example, (fH, 0) represents a spatial frequency having a spatial frequency fH in the horizontal direction and a spatial frequency 0 in the vertical direction.

The frequency component of the diced pattern appearing when there is a light-quantity difference between the two original images has a period of two times the amount of shift resulted from the image shift with its direction coincident with the direction of the image shift. This is explained by reference to FIG. 4.

In FIG. 4, when consideration is given to an image-shift direction passing through pixel s(1, 1), a pixel row in a diagonal direction passing through s(2, 2), s(3, 3), s(4, 4), s(5, 5) and s(6, 6) is picked up. Among these, those pixels s of the combined image related to the pixels of the first original image are s(1, 1), s(3, 3) and s(5, 5). Further, those pixels s of the combined image related to the pixels s of the second original image are s(2, 2), s(4, 4) and s(6, 6). That is, pixels of the first original image and pixels of the second original image are alternately aligned.

Where there is a light-quantity difference between the two original images, a spatial frequency having a two-pixel period appears in the pixel row in the diagonal direction. This spatial frequency having a two-pixel period, whose direction is identical to the first diagonal direction U1, has a value as described below in this direction.

$$1/\sqrt{(PH)^2+(PV)^2}$$

When consideration is given to the spatial frequency on a one-dimension spatial basis with respect to the first diagonal direction U1 in this manner, the spatial frequency that appears when there is a light-quantity difference between the two original images is equal to Fd in FIG. 5. Fd is represented as a two-dimensional spatial frequency having components (fH/2, fV/2) and (−fH/2, −fV/2). The frequency component Fd is located on the border line connecting point (fH, 0) and point (0, fV) as well as on the border line connecting (−fH, 0) and point (0, −fV).

Moreover, with respect to the horizontal and vertical directions, the frequency component of the diced pattern that appears when there is a light-quantity difference between the two original images is equal to Fc in FIG. 5. In other words, the spatial frequency is represented by (fH, 0), (0, fV), (−fH, 0) and (0, −fV). This is explained by reference to FIG. 21 and FIG. 22.

Figure 21:
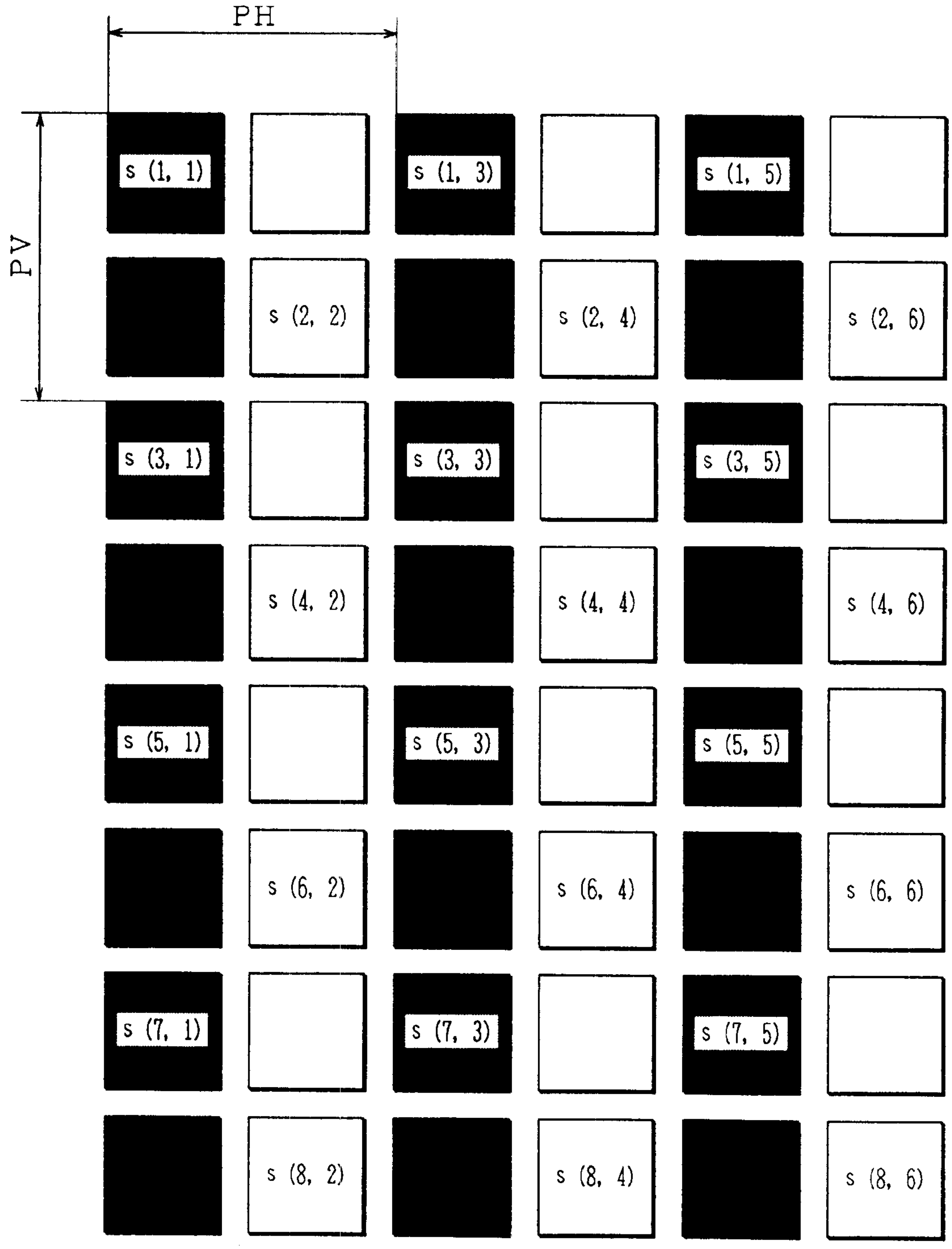
FIG. 21 is a plan view of a spatial frequency that explains longitudinal stripes occurring due to a light-quantity difference.

FIG. 21 shows a combined image having a spatial frequency of (fH, 0) or (−fH, 0). The spatial frequency of (fH, 0) or (−fH, 0) is represented by longitudinal stripes having a frequency PH in the horizontal direction. In FIG. 21, it is represented by a longitudinal striped pattern having alternate black pixel rows and white pixel rows.

Figure 22:
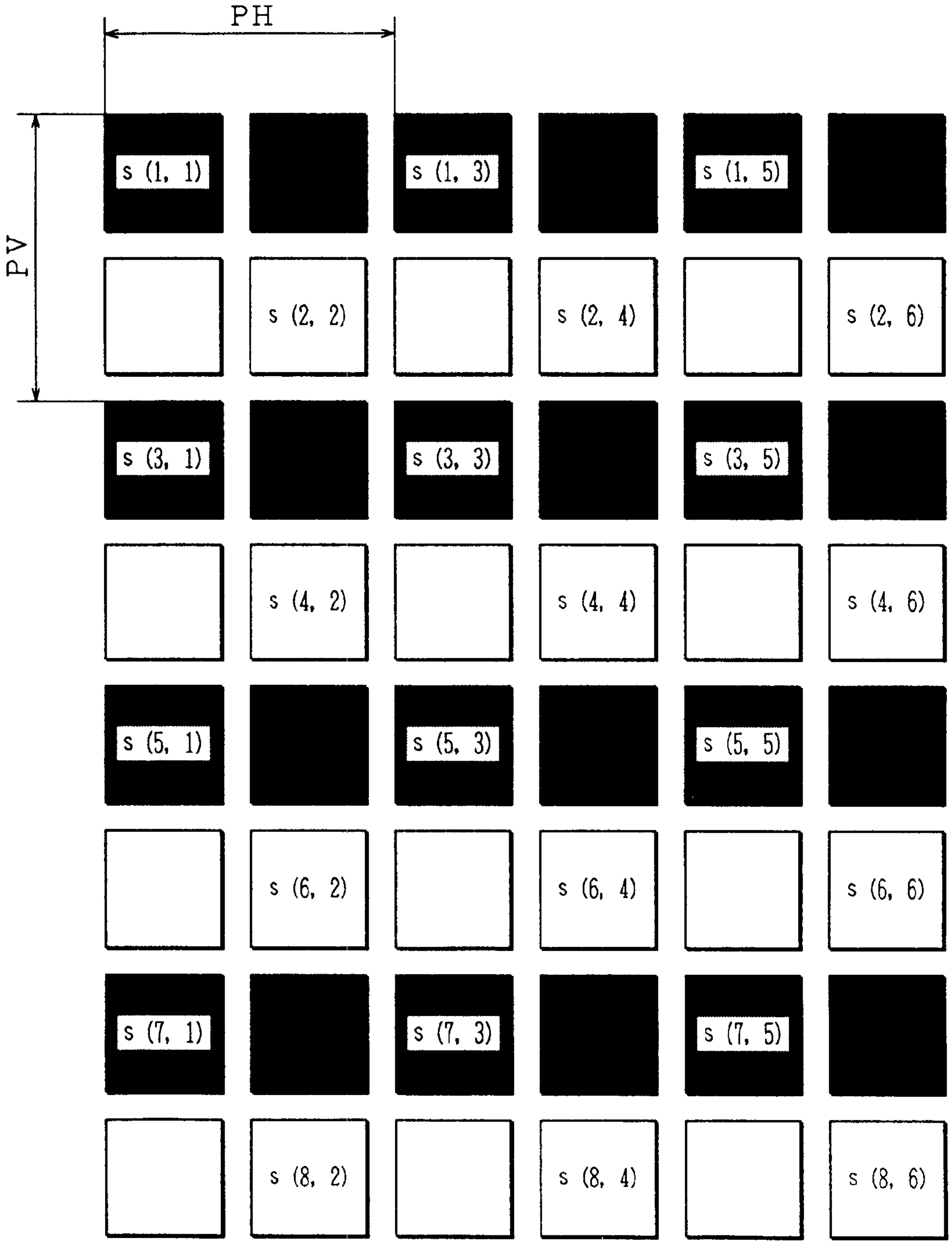
FIG. 22 is a plan view of a spatial frequency that explains lateral stripes occurring due to a light-quantity difference.

FIG. 22 shows a combined image having a spatial frequency of (0, fv) or (0, −fV). The spatial frequency of (0, fV) or (0, −fV) is represented by lateral stripes having a frequency of PV in the vertical direction. In FIG. 22, it is represented by a lateral striped pattern having alternate black pixel rows and white pixel rows.

In both of FIGS. 21 and 22, the black pixels include all the pixels of the first original image, and the white pixels include all the pixels of the second original image. Therefore, the spatial frequency that appears when there is a light-quantity difference between the two original images contains Fc.

Here, the frequency component Fc is located on a border line connecting point (fH, 0) and point (0, fV) as well as on a border line connecting point (−fH, 0) and point (0, −fV).

The LPF 59 is used to cut off the above-mentioned spatial frequencies, and if it is constructed as a one-dimensional filer, the direction of its one-dimensional filter of the LPF 59 is preferably set equal to the first diagonal direction U1, its gain on the frequency Fd is preferably set at zero, and its pass band is preferably set identical to the base band 11. In this case, the LPF 59 is arranged so that it cuts off only a portion over a broken line 12 including the spatial frequency Fd.

Moreover, in order not to attenuate the frequency component that the original images originally possess (in order not to make the image blurred), the LPF 59 is desirably set so that the gain is 1 in a region within the rectangular region except the border lines. Furthermore, in order not to cause distortion in the image after having been subjected to the low-pass process, that is, the combined image after the light-quantity difference correction, the LPF 59 is desirably set so that it has a linear phase characteristic.

In the case when the LPF 59 is constructed as a two-dimensional filter, the gain on the border line 12 is preferably set at zero, and its pass band is preferably set identical to the base pass band 11. Further, in order not to attenuate the frequency component that the original images originally possess (in order not to make the image blurred), the LPF 59 is desirably set so that the gain is 1 in a region within the rectangular region except the border lines. Furthermore, in order not to cause distortion in the image after having been subjected to the low-pass process, that is, the combined image after the light-quantity difference correction, the LPF 59 is desirably set so that it has a linear phase characteristic.

With respect to these one-dimensional filters and two-dimensional filters, low-pass filters (r1 through r4), explained in Embodiment 1, can be applied; however, in this embodiment, an explanation will be given of the following low-pass filter:

The most conspicuous component among the spatial frequency components that cause the striped pattern is the maximum absolute value frequency component Fc in the horizontal and vertical directions in the base band 11. Therefore, in the case of the two-dimensional filter, the use of a low-pass filter that makes only the gain on the frequency component Fc zero makes the striped pattern less conspicuous.

Figure 23:
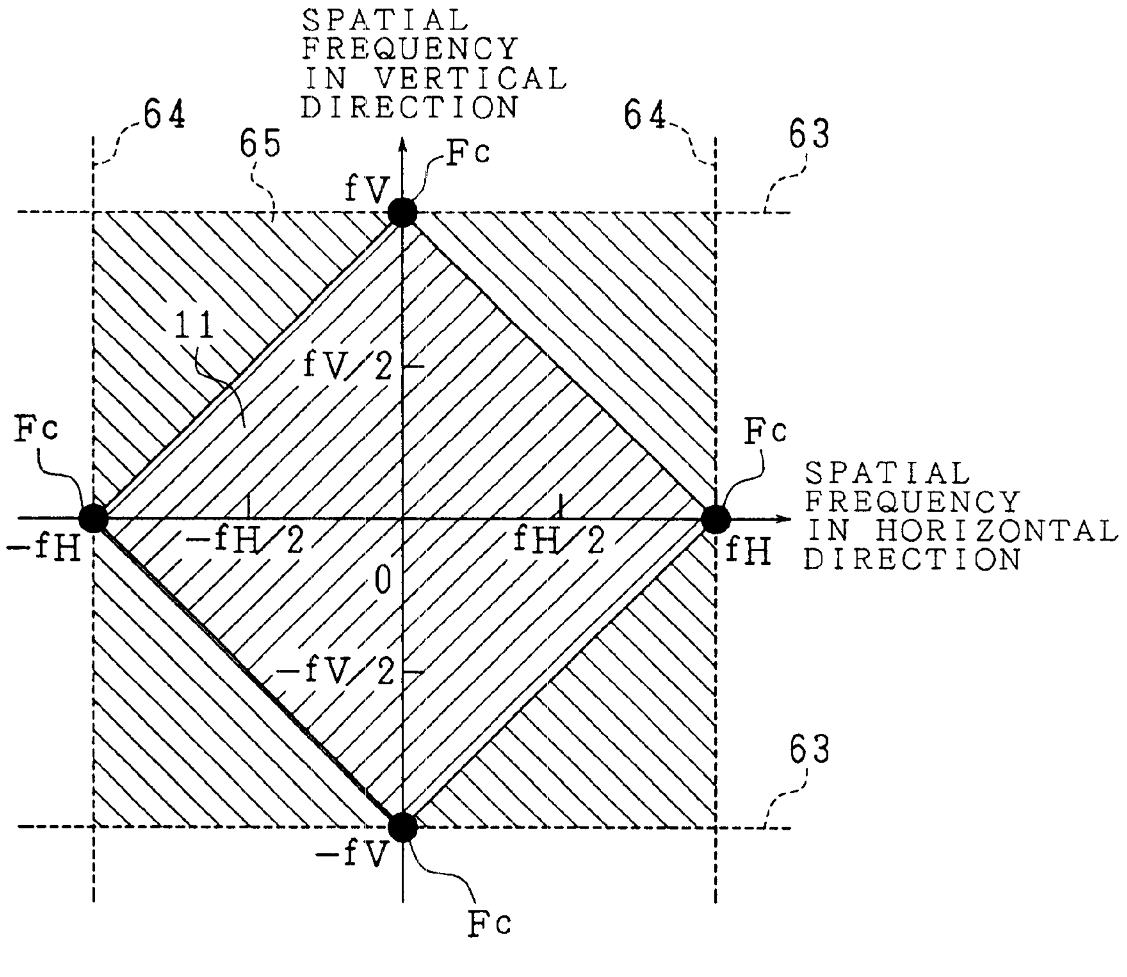
FIG. 23 is a plan view of a spatial frequency that shows a transmitting band of an LPF installed in the image pick-up apparatus shown in FIG. 20.

Referring to FIG. 23, an explanation will be given of the low-pass characteristic of such a low-pass filter. This low-pass filter is preferably set so that its gains on the broken lines 63 and 64 in FIG. 23 becomes zero and it has a region 65 surrounded by the broken lines 63 and 64 (indicated by a hatched region which has lines slanting down to the right in the drawing and which includes the base band 11 in this case) as its pass band. Further, in order not to attenuate the frequency component that the original images originally possess (in order not to make the image blurred), the LPF 59 is desirably set so that the gain is 1 in a region within the rectangular region except the border lines 63, 64. Furthermore, in order not to cause distortion in the image after having been subjected to the low-pass process, that is, the combined image after the light-quantity difference correction, the LPF 59 is desirably set so that it has a linear phase characteristic.

Such a low-pass filter that satisfies the above-mentioned requirements tends to become very high in its order. Low-pass filters with a high order tend to take time in processing and require a large circuit scale, thereby failing to meet practical use. Therefore, a proper order is set by taking into consideration the conditions the low-pass filter must satisfy and the required processing time and circuit scale. For example, low-pass filter m1 that is represented by the following equation (43) is listed.

$$m1 = \frac{1}{64}\begin{bmatrix} 1 & -5 & -5 & 1 \\ -5 & 25 & 25 & -5 \\ -5 & 25 & 25 & -5 \\ 1 & -5 & -5 & 1 \end{bmatrix} \tag{43}$$

This low-pass filter m1 is a two-dimensional low-pass filter that is represented by a matrix having 4 rows and 4 columns. Supposing that a component at row p and column q is represented by m1(p, q), a calculation for carrying out a light-quantity difference correction on the combined image by using low-pass filter m1 is obtained by the following equation (44):

$$t(n, m) = \sum_{p=1}^{4} \sum_{q=1}^{4} s(n + p - 2, m + q - 2) \cdot m1(p, q) \tag{44}$$

Here, s(n, m) represents a pixel at row n and column m of the combined image before the light-quantity difference correction. Further, t(n, m) represents a pixel at row n and column m of the combined image after the light-quantity difference correction. As shown in FIG. 4, the virtual pixels have no pixel data. Therefore, prior to calculations of the low-pass filter m1, pixel data of the virtual pixels are found by interpolation by using the interpolation-processing section 55.

Low-pass filter m2, which is more simplified than low-pass filter m1, is represented by the following equation (45).

$$m2 = \frac{1}{16}\begin{bmatrix} 1 & 2 & 1 \\ 2 & 4 & 2 \\ 1 & 2 & 1 \end{bmatrix} \quad (45)$$

This low-pass filter m2 is a two-dimensional low-pass filter that is represented by a matrix having 3 rows and 3 columns. Supposing that a component at row p and column q is represented by m2(p, q), a calculation for carrying out a light-quantity difference correction on the combined image by using low-pass filter m2 is obtained by the following equation (46):

$$t(n, m) = \sum_{p=1}^{3}\sum_{q=1}^{3} s(n+p-2, m+q-2)\cdot m2(p, q) \quad (46)$$

As shown in FIG. 4, the virtual pixels have no pixel data. Therefore, prior to calculations of the low-pass filter m2, pixel data of the virtual pixels are found by interpolation by using the interpolation-processing section 55.

The advantage of low-pass filter m2 is that the amount of calculations required is less than that required for low-pass filter m1. However, low-pass filter m2 has such a tendency that the gain of the pass band 65 becomes smaller than 1 as it comes closer to the border lines 63, 64. The resulting disadvantage is that it has an inferior pass band characteristic as compared with low-pass filter m1, resulting in blurredness in the combined image after the light-quantity difference correction.

Moreover, the above-mentioned two-dimensional low-pass filter m1 is divided into a one-dimensional low-pass filter (hereinafter, referred to as a horizontal low-pass filter) mh1 in the horizontal direction and a one-dimensional low-pass filter (hereinafter, referred to as a vertical low-pass filter) mv1 in the vertical direction. Low-pass filter mh1 is a one-dimensional low-pass filter represented as a row vector. Furthermore, low-pass filter mv1 is a one-dimensional low-pass filter represented by a column vector. Low-pass filters mh1 and mv1 are given by the following equations (47) and (48).

$$mh1 = \frac{1}{8}[-1 \quad 5 \quad 5 \quad -1] \quad (47)$$

-continued $$mv1 = \frac{1}{8}\begin{bmatrix} -1 \\ 5 \\ 5 \\ -1 \end{bmatrix} \quad (48)$$

A calculation for carrying out a light-quantity difference correction on the combined image by using the horizontal low-pass filter mh1 and the vertical low-pass filter mv1 is given by the following equation (49).

$$t(n, m) = mh1\cdot\begin{bmatrix} s(n-1, m-1) & s(n, m-1) & s(n+1, m-1) & s(n+2, m-1) \\ s(n-1, m) & s(n, m) & s(n+1, m) & s(n+2, m) \\ s(n-1, m+1) & s(n, m+1) & s(n+1, m+1) & s(n+2, m+1) \\ s(n-1, m+2) & s(n, m+2) & s(n+1, m+2) & s(n+2, m+2) \end{bmatrix}\cdot mv1 = \quad (49)$$

$$\frac{1}{8}[-1 \quad 5 \quad 5 \quad -1]\cdot\begin{bmatrix} s(n-1, m-1) & s(n, m-1) & s(n+1, m-1) & s(n+2, m-1) \\ s(n-1, m) & s(n, m) & s(n+1, m) & s(n+2, m) \\ s(n-1, m+1) & s(n, m+1) & s(n+1, m+1) & s(n+2, m+1) \\ s(n-1, m+2) & s(n, m+2) & s(n+1, m+2) & s(n+2, m+2) \end{bmatrix}\cdot\frac{1}{8}\begin{bmatrix} -1 \\ 5 \\ 5 \\ -1 \end{bmatrix}$$

As described above, since the two-dimensional low-pass filter m1 is constructed by series-connecting the horizontal low-pass filter mh1 and the vertical low-pass filter mv1, it is possible to simplify the circuit construction.

Figure 24:
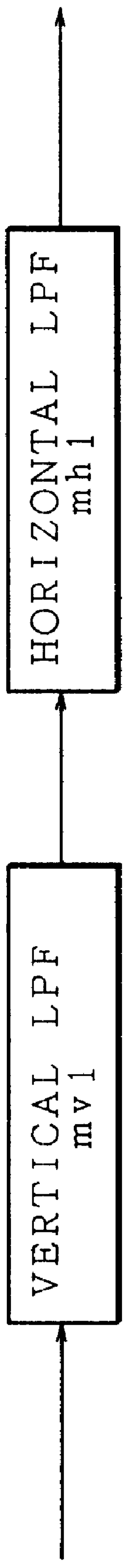
FIG. 24 is a schematic block diagram showing the LPF with a series-connected construction of Embodiment 5.

FIG. 24 is a block diagram that shows an example of this construction in which the vertical low-pass filter mv1 and the horizontal low-pass filter mh1 are series-connected. By inputting the pixel data of the combined image to the series-connected circuit in a non-interlace manner, the circuit is allowed to output pixel data that has been subjected to a two-dimensional low-pass filtering process.

Figure 25:
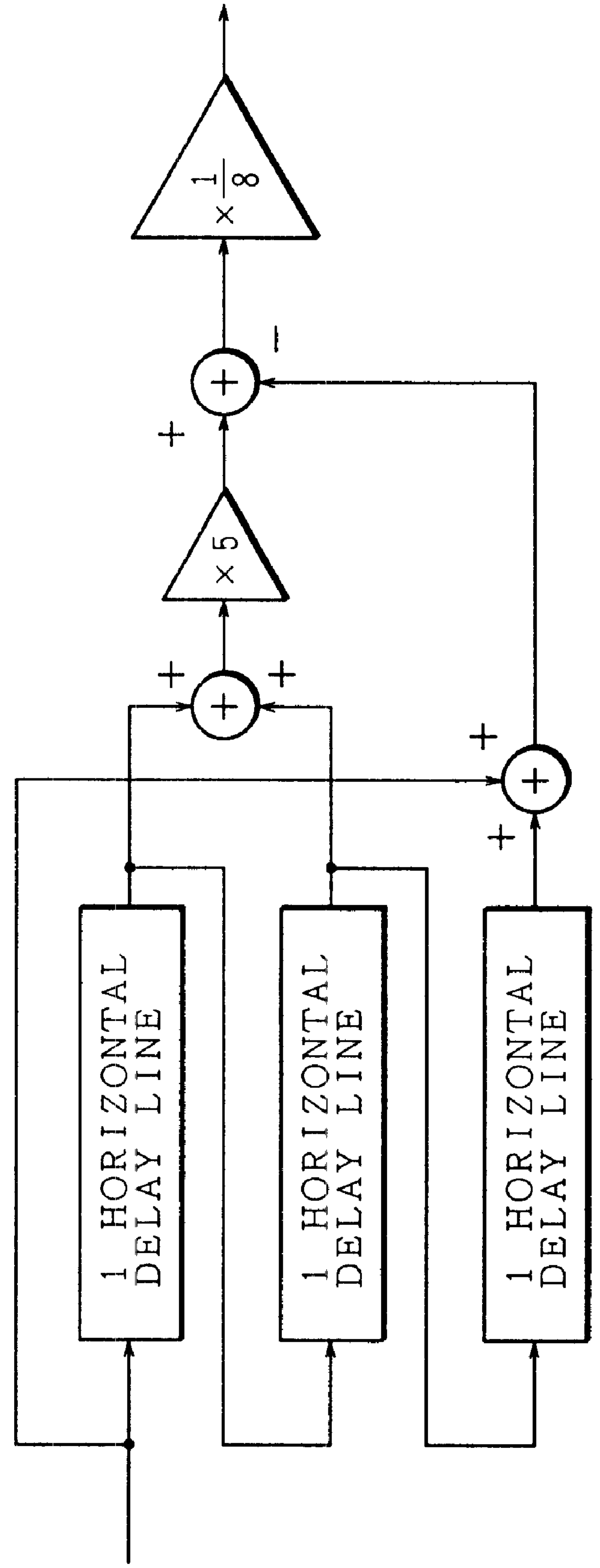
FIG. 25 is a schematic block diagram showing a vertical low-pass filter of Embodiment 5.
Figure 26:
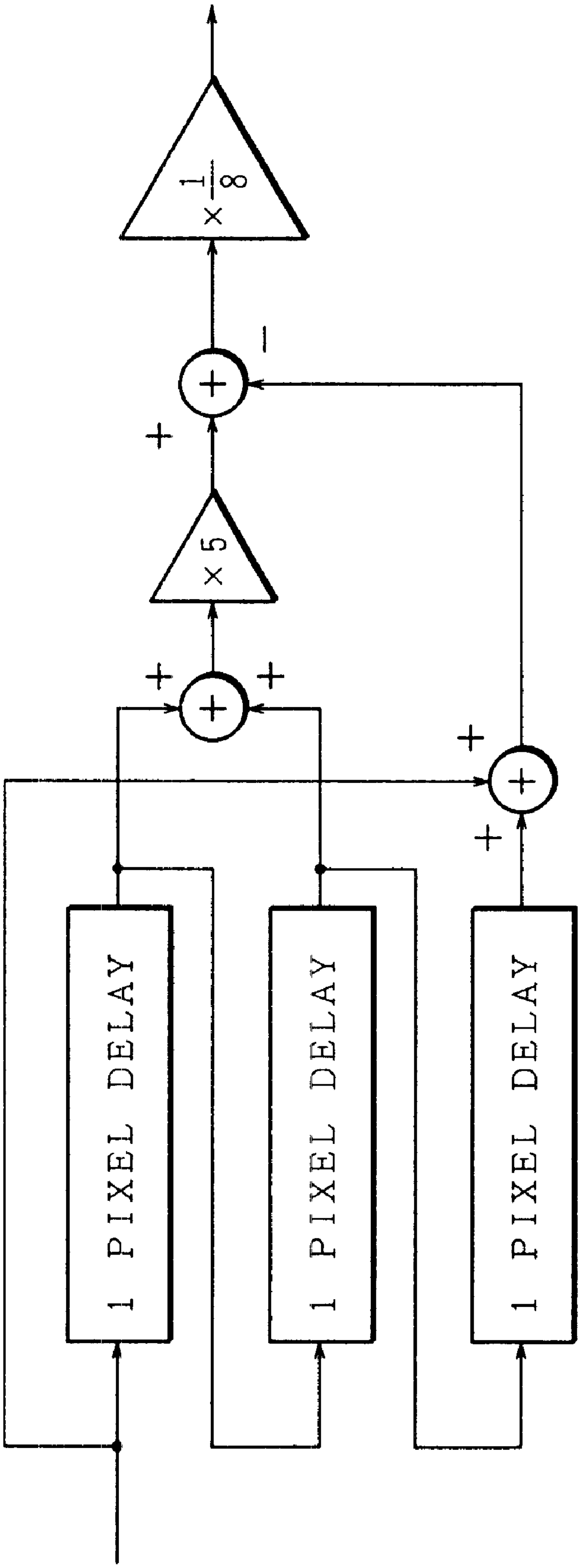
FIG. 26 is a schematic block diagram showing a horizontal low-pass filter of Embodiment 5.
Figure 27:
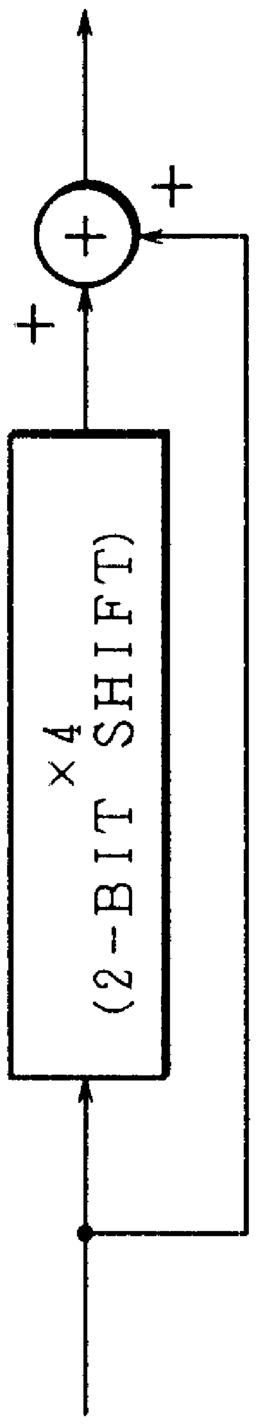
FIG. 27 is a block diagram showing a five-fold multiplier constituted by a bit shift and an adder of Embodiment 5.

FIG. 25 shows an example the circuit construction of the vertical low-pass filter mv1 and FIG. 26 shows an example of the circuit construction of the horizontal low-pass filter mh1. Each circuit can carry out calculations by using three adders and one five-fold multiplier. Here, a ⅛ divider can carry out calculations by using three-bit shifts. Further, the five-fold multiplier can be constructed by bit shifts and adders (see FIG. 27).

Figure 28:
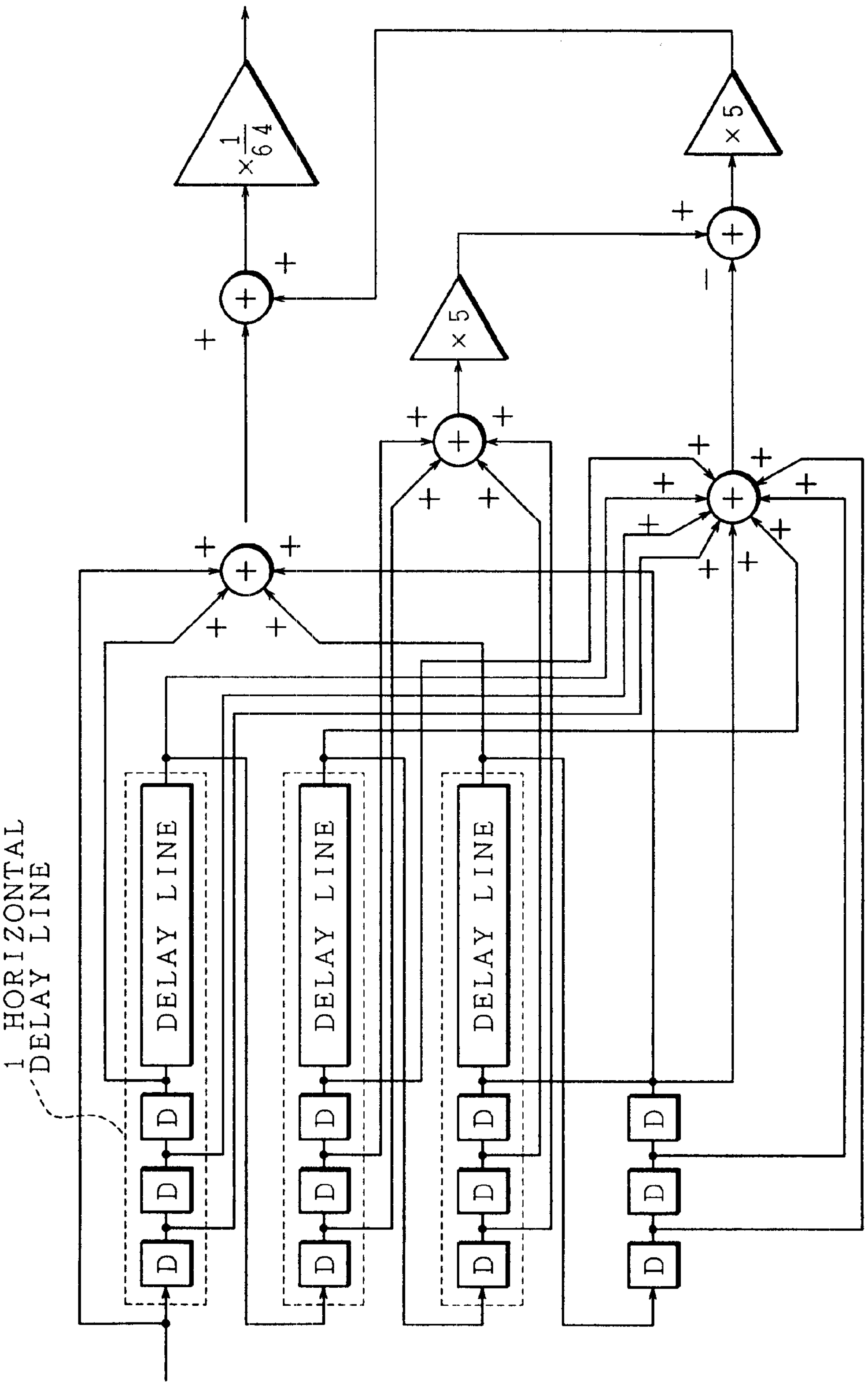
FIG. 28 is a block diagram of a two-dimensional low-pass filter of Embodiment 5.

FIG. 28 shows a block diagram in which the two-dimensional low-pass filter m1, as it is, is provided as a circuit. In this Figurer, D represents each 1 pixel delay element, and each block indicated by a broken line represents a 1 horizontal delay line. Therefore, the number of delay pixels in the delay line within the broken-line block is three pixels fewer than the number of horizontal pixels of the output image. In this circuit, calculations are carried out by 15 adders and two five-fold multipliers. This circuit requires a larger number of adders as compared with the series-connected circuit.

Moreover, the above-mentioned two-dimensional low-pass filter m2 is divided into a horizontal low-pass filter mh2 and a vertical low-pass filter mv2. Horizontal low-pass filter mh2 is a one-dimensional low-pass filter represented as a row vector. Furthermore, vertical low-pass filter mv2 is a one-dimensional low-pass filter represented by a column ventor. Low-pass filters mh2 and mv2 are given by the following equations (50) and (51).

$$mh2 = \frac{1}{4}[1 \quad 2 \quad 1] \tag{50}$$

$$mv2 = \frac{1}{4}\begin{bmatrix}1\\2\\1\end{bmatrix} \tag{51}$$

A calculation for carrying out a light-quantity difference correction on the combined image by using the horizontal low-pass filter mh2 and the vertical low-pass filter mv2 is given by the following equation (52).

$$t(n, m) = mh2 \cdot \begin{bmatrix} s(n-1, m-1) & s(n, m-1) & s(n+1, m-1) \\ s(n-1, m) & s(n, m) & s(n+1, m) \\ s(n-1, m+1) & s(n, m+1) & s(n+1, m+1) \end{bmatrix} \cdot mv2 = \tag{52}$$

$$\frac{1}{4}[1 \quad 2 \quad 1] \cdot \begin{bmatrix} s(n-1, m-1) & s(n, m-1) & s(n+1, m-1) \\ s(n-1, m) & s(n, m) & s(n+1, m) \\ s(n-1, m+1) & s(n, m+1) & s(n+1, m+1) \end{bmatrix} \cdot \frac{1}{4}\begin{bmatrix}1\\2\\1\end{bmatrix}$$

As described above, since the two-dimensional low-pass filter m2 is constructed by series-connecting the horizontal low-pass filter mh2 and the vertical low-pass filter mv2, it is possible to simplify the circuit construction.

Moreover, with the construction of the present embodiment, edges in the horizontal direction or in the vertical direction, contained in the image, can be properly corrected.

Figure 29:
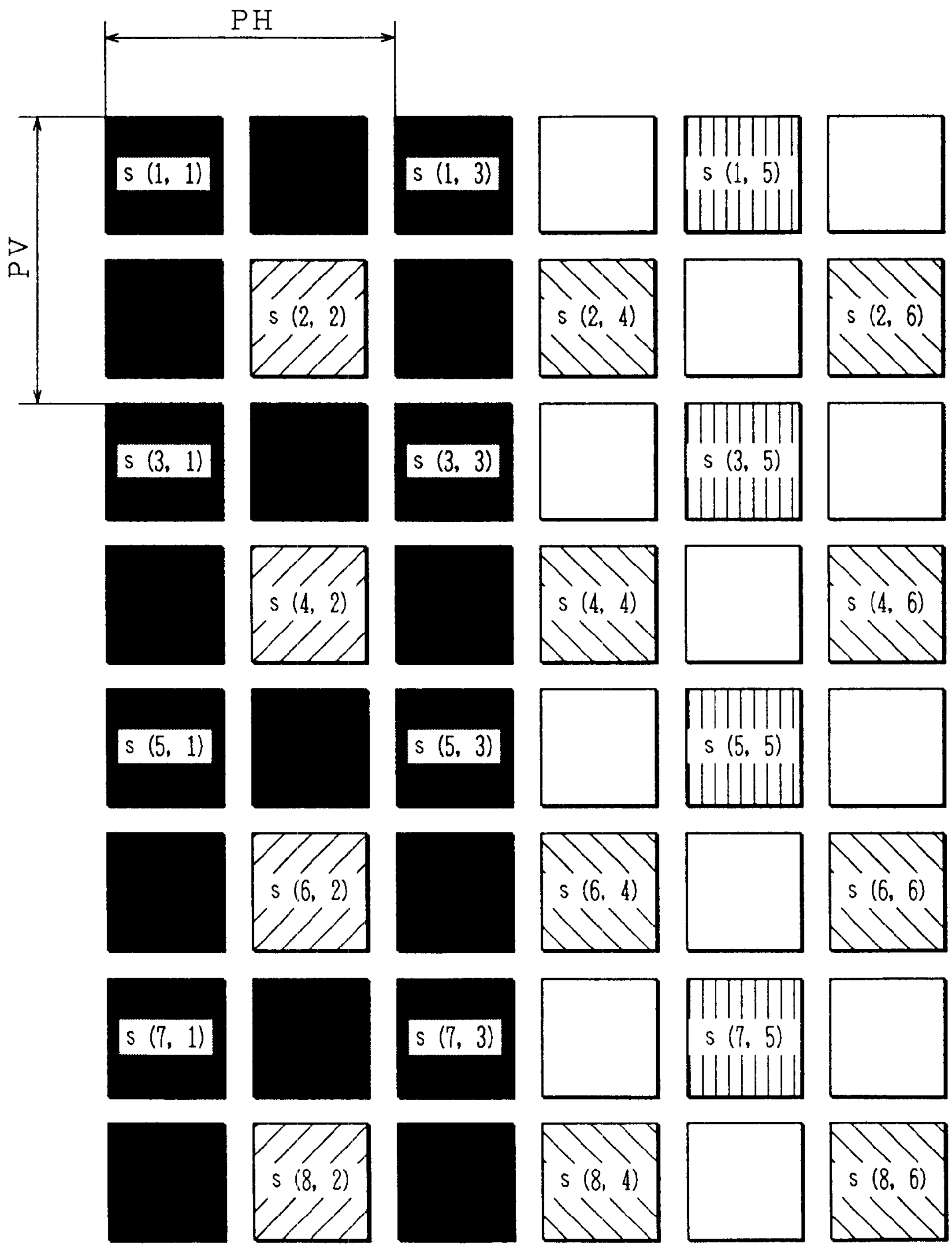
FIG. 29 is an explanatory drawing that shows a combined image in the case when an edge in the vertical direction was picked up.

FIG. 29 shows an example in which an edge in the vertical direction has been picked up. In pixels s(p, q), q≦3 represents the black level and q>4 represents the white level; therefore, there is an edge between q=3 and 4 in the vertical direction. In the first original image, it is supposed that the black level is 10 and the white level is 200. In other words, suppose that s(p, 1)=10, s(p, 3)=10 and s(p, 5)=200. In the second original image, suppose that the black level is 0 and the white level is 190 due to a light-quantity difference appearing between the two original images. In other words, suppose that s(p, 2)=0, s(p, 4)=190 and s(p, 6)=190.

Figure 30:
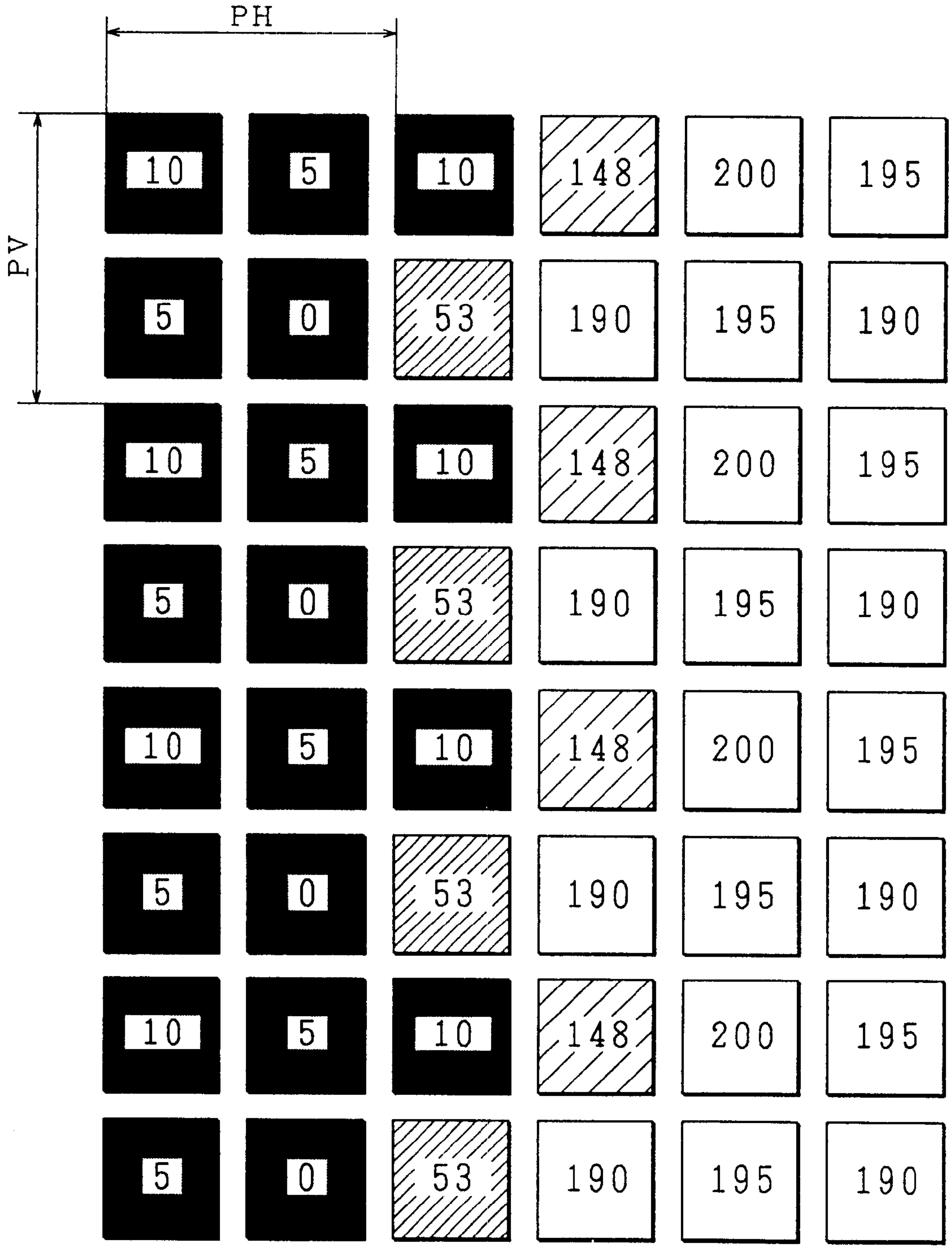
FIG. 30 is an explanatory drawing that shows an image after an interpolation in the case when the edge in the vertical direction was picked up.
Figure 31:
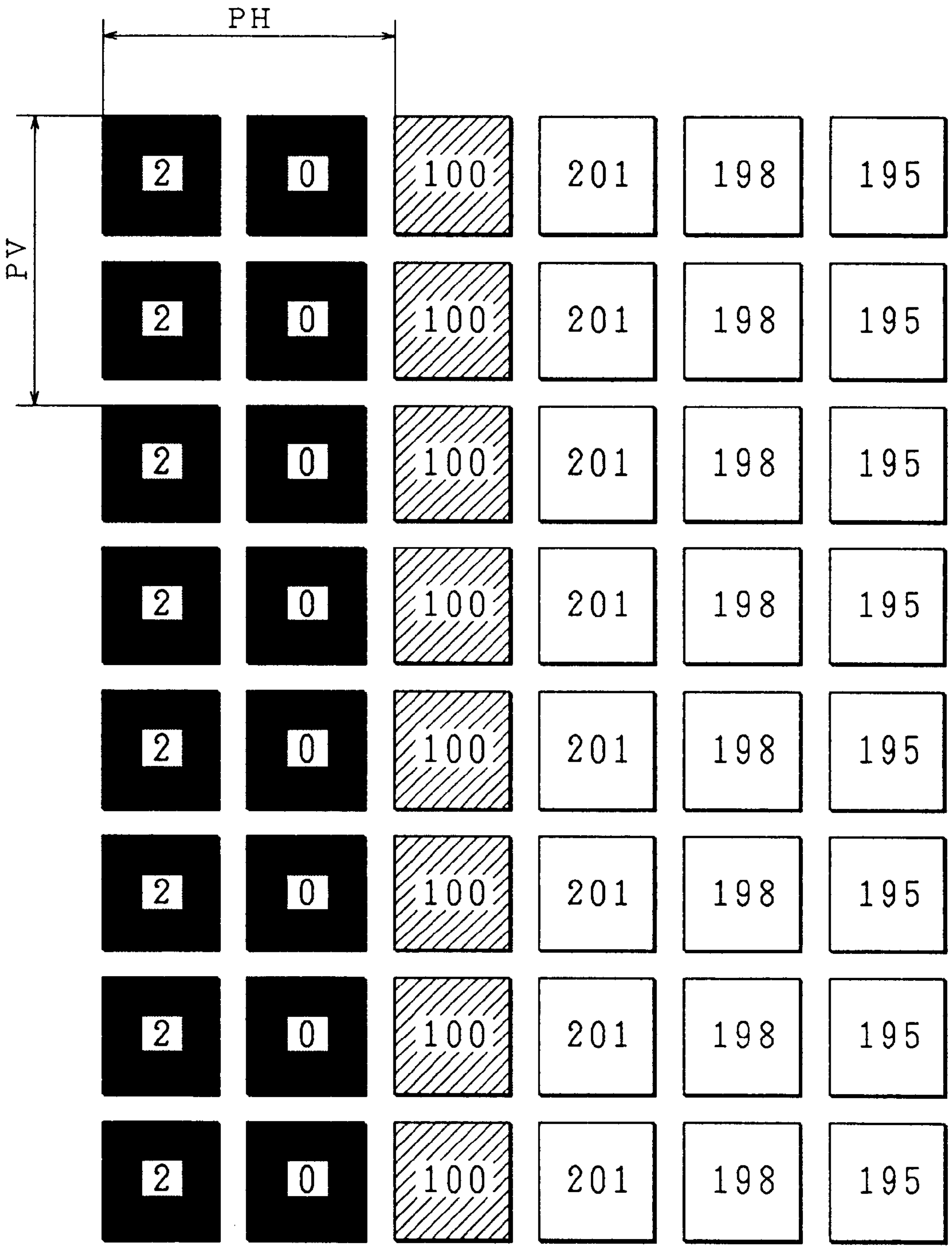
FIG. 31 is an explanatory drawing that shows an image after a light-quantity difference correction in the case when the edge in the vertical direction was picked up.
Figure 32:
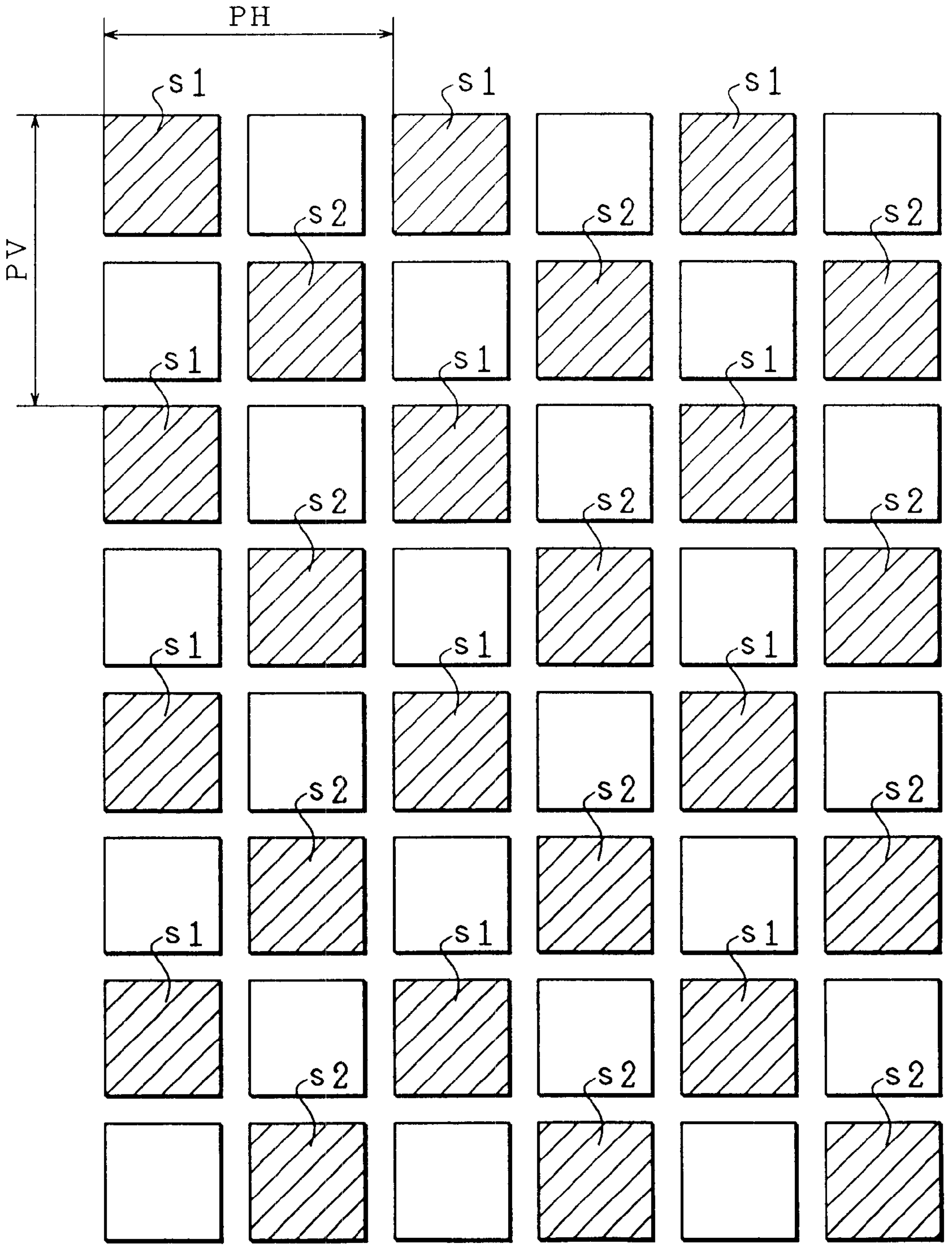
FIG. 32 is an explanatory drawing that shows a combined image constituted by the first and second original images, which explains an image-shift mechanism.
Figure 33:
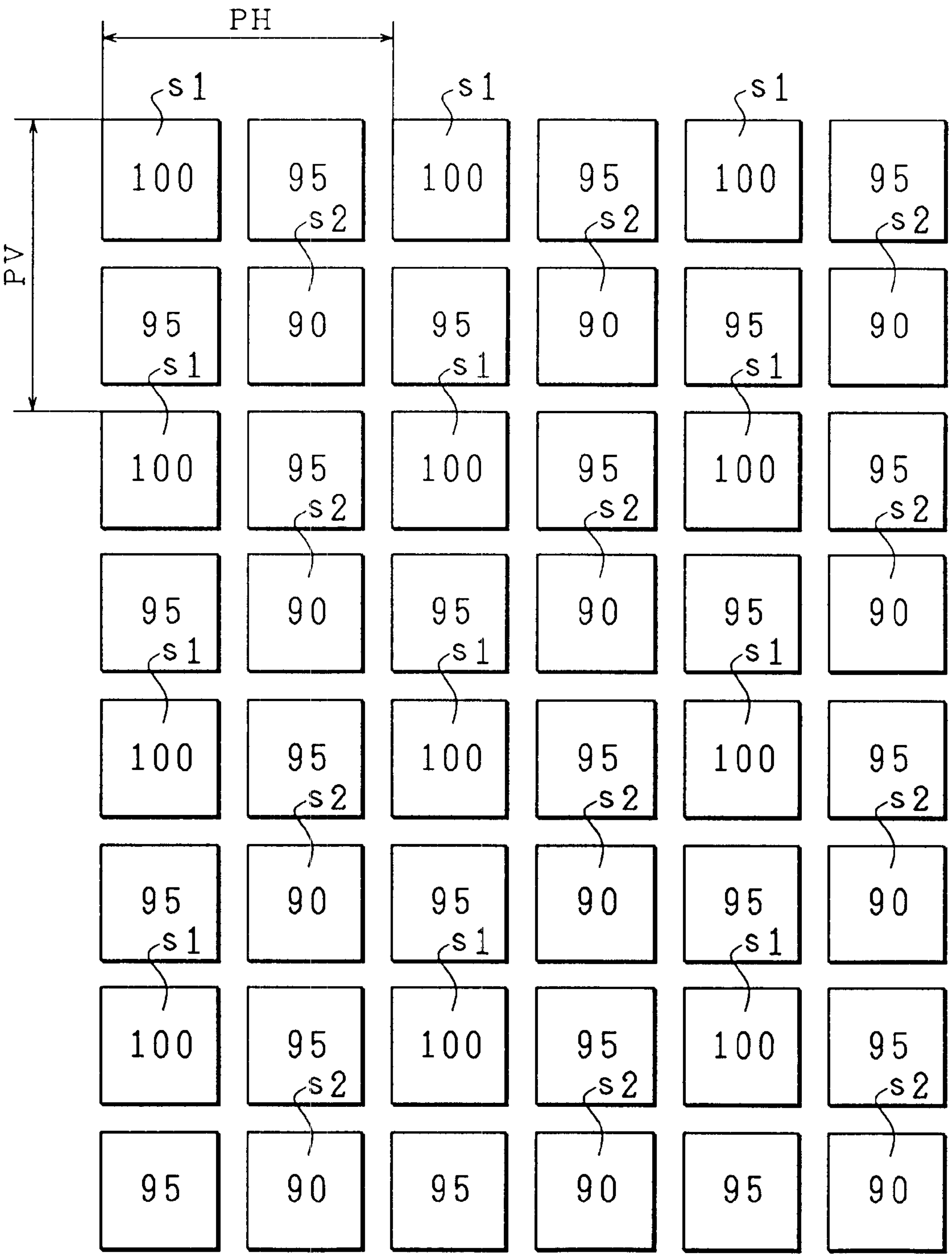
FIG. 33 is an explanatory drawing that shows the occurrence of a light-quantity difference.
Figure 34:
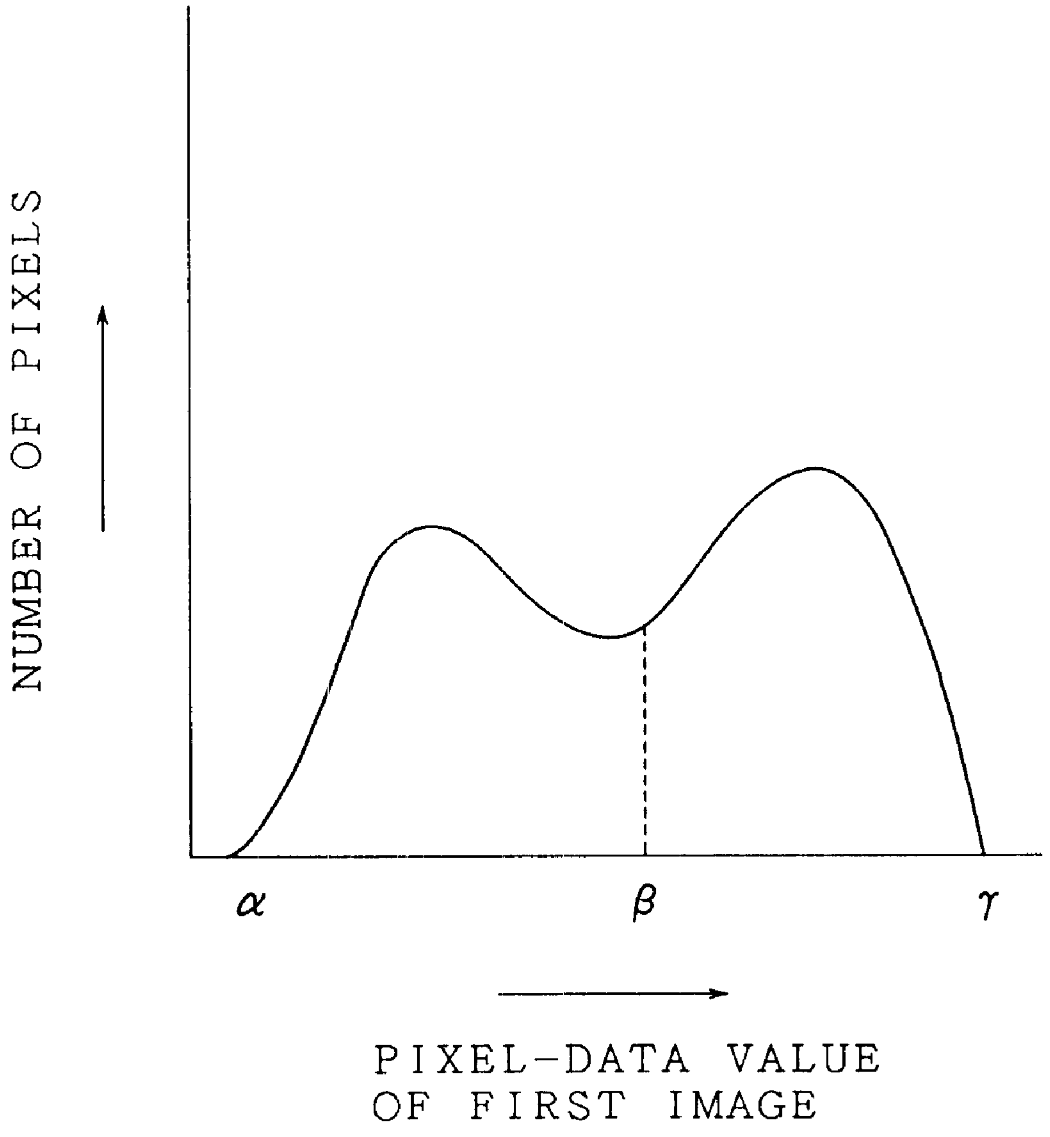
FIG. 34 is a histogram of the first original image in a conventional light-quantity difference correcting method.
Figure 35:
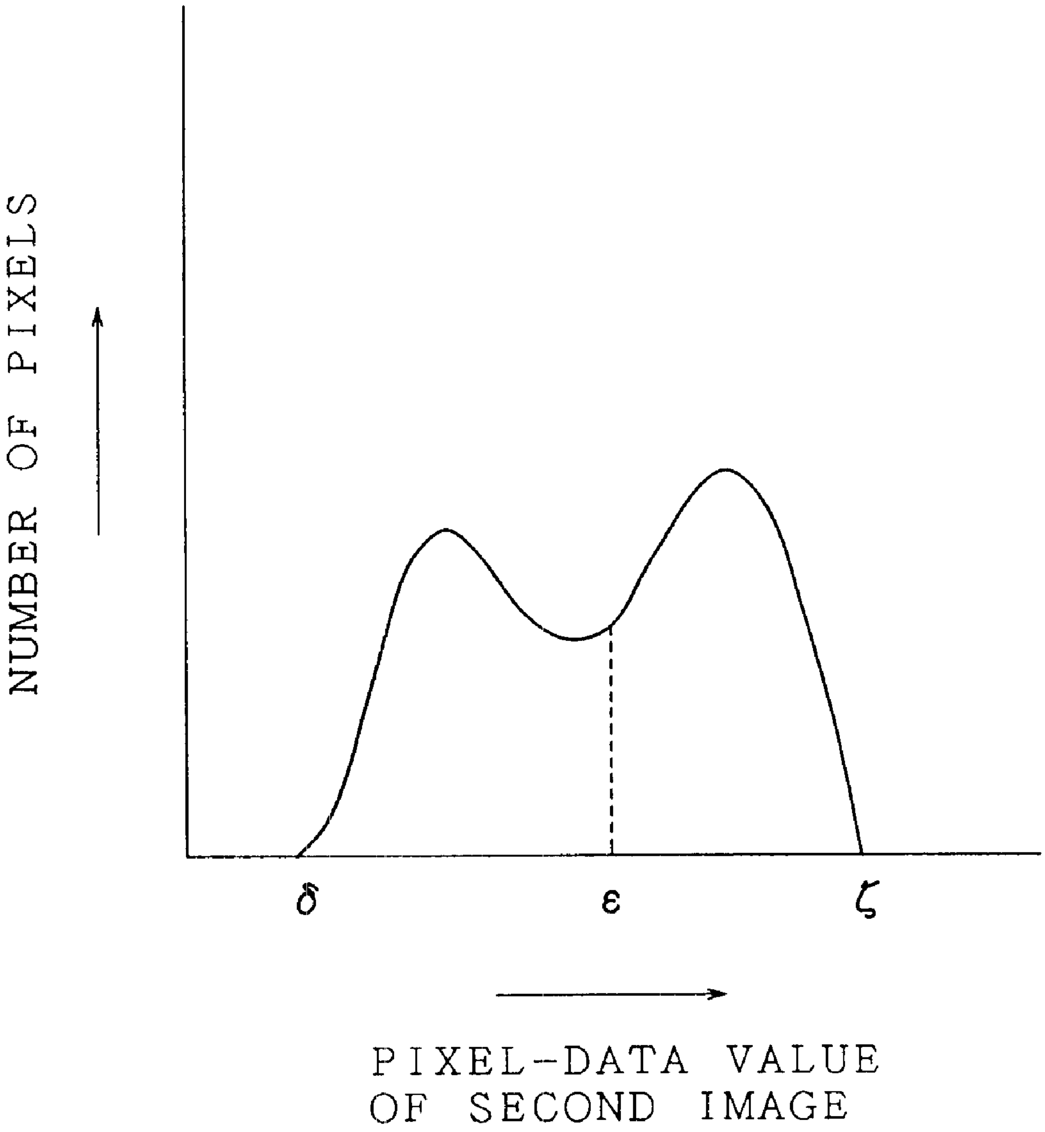
FIG. 35 is a histogram of the second original image in the conventional light-quantity difference correcting method.
Figure 36:
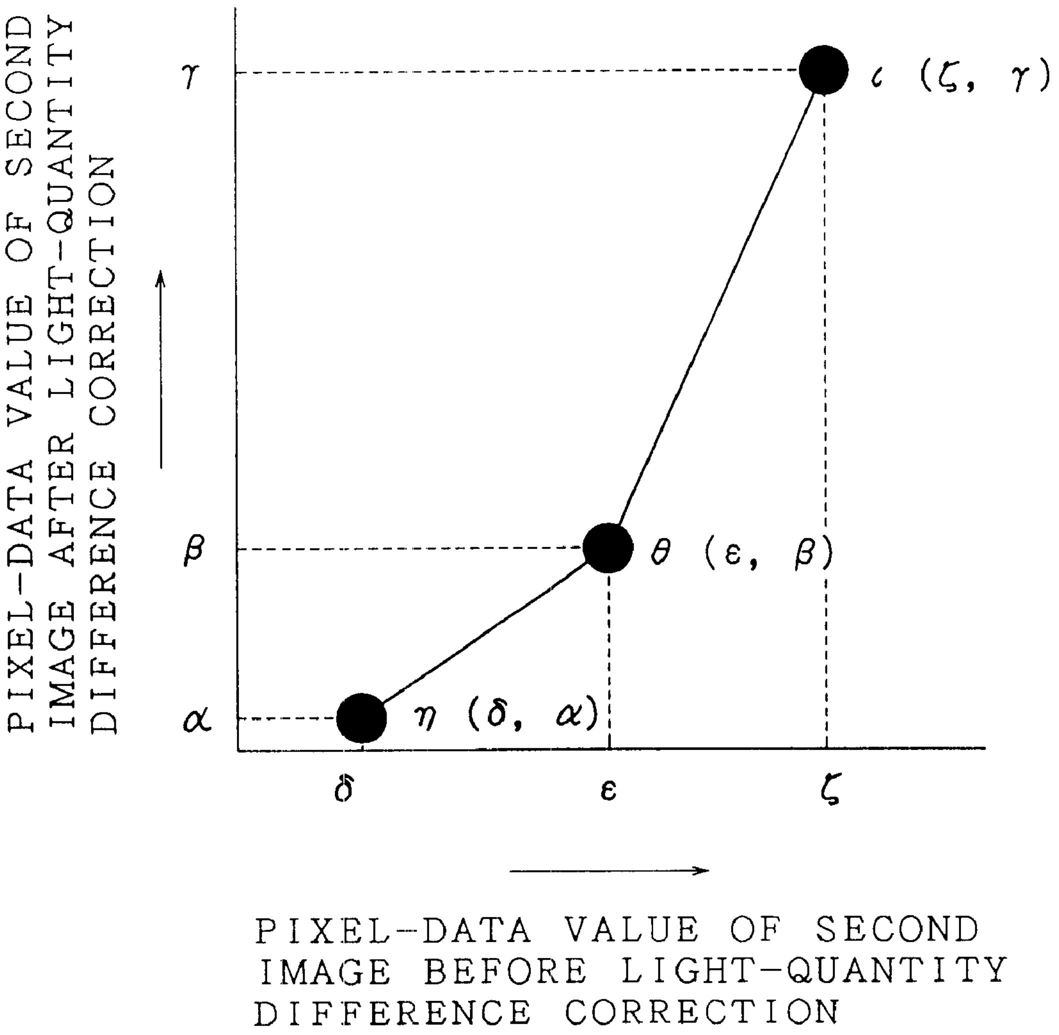
FIG. 36 is an explanatory drawing that shows a pixel-data conversion in the conventional light-quantity difference correcting method.

FIG. 30 shows pixel values of the respective pixels and values of pixel data of the virtual pixels that have been calculated by the linear interpolation method. The edge, which was straight in the vertical direction, appears to be a zigzag edge. When the light-quantity difference correction process is carried out on this image in accordance with equation (49), an edge as shown in FIG. 31 is obtained. The zigzag edge is corrected to an edge in the vertical direction. Further, the same accurate correction can be carried out on an edge in the horizontal direction.

Moreover, in the present embodiment, since the low-pass filtering process is carried out after the interpolation process, it is possible to simultaneously correct degradation in the image quality due to the interpolation process, that is, the occurrence of image irregularities due to specific frequency components. This is because the frequency components of image irregularities occurring due to the interpolation process is normally coincident with the frequency components due to a light-quantity difference at the time of the image shift.

Meanwhile, with respect to filters such as low-pass filters, it is impossible to create a filter having an ideal characteristic in which the gain related to a frequency component to be cut is zero and the gains related to the other frequency components are 1.

Therefore, in general, when the gain related to a frequency component to be cut is set at zero, the gain in the vicinity of the above-mentioned frequency components tends to become lower than 1.

For this reason, in the case when the frequency component, which corresponds to a striped pattern that appears due to a light-quantity difference, is cut (attenuated) as in the case of the present invention, one portion of the frequency components of the base band is inevitably attenuated; however, in the present embodiment, since the frequency components to be cut by the filter are limited to the apexes in the horizontal and vertical directions of the base band (the frequency components whose absolute values on the horizontal axis and vertical axis are maximum) indicated by the spatial frequency coordinates, the frequency components, which are to be attenuated, can be reduced as compared with the case in which the border lines of the base band are cut as shown in Embodiments 1 through 4. Consequently, it becomes possible to reduce degradation of the image quality.

Additionally, in the present embodiment, (1) after producing a combined image by combining two original image signals, (2) the interpolation-processing section 55 finds image data for the virtual pixels by interpolation with respect to the combined image, and (3) the LPF 59 carries out the low-pass filtering process on the interpolated image; however, this processing sequence is not limited by this order, and the interpolation process may be carried out after the low-pass filtering process has been carried out on the combined image. Therefore, the LPF 59 (m1, m2) of the present embodiment may be used in place of the LPF 5 in the construction of FIG. 1 explained in Embodiment 1. In this case, the LPF 59 carries out the low-pass filtering process with the pixel data in the virtual pixels being set at zero. Moreover, the low-pass filtering process and the interpolation process may be carried out at the same time.

In the above-mentioned Embodiment, the explanation was given of an image pick-up apparatus by assuming that the apparatus picks up monochromatic images. However, the present invention can also be applied to those apparatuses for picking up color images.

There are, for example, two types of color image pick-up apparatuses, that is, a single-plate system and a three-plate system.

In an image pick-up apparatus of the single-plate system, a color filter, which regulates the wave-length of light to be received by the respective light-receiving regions, is placed on the light-incident side of the charge-coupled device, and light that has passed through the filter is picked up.

In an image pick-up apparatus of the three-plate system, imaging light is separated by a color-separation prism into monochromatic imaging light rays of three primary colors, that is, red, blue and green, and the charge-coupled devices pick up these monochromatic imaging light rays separately. Therefore, the image pick-up apparatus of the three-plate system has three charge-coupled devices.

In the LPF 59, image signals derived from the respective monochromatic imaging light rays, obtained by the image pick-up apparatus of the single-plate system or the three-plate system, are treated as signals having vector quantities indicating respective color hues of, for example, the three primary colors, red, green and blue (where the number of types u of image data per one imaging light is 3), and a low-pass filtering process is carried out individually on each monochromatic-imaging-light image signal. Alternatively, the LPF 59 produces a luminance signal and color-difference signals of two types from the color image signal (where the number of types u of image data per one imaging light is 3), and a low-pass filtering process is carried out individually on each of the luminance signal and the color-difference signals. Thus, it is possible to correct the light-quantity difference of the output image also in a color image pick-up apparatus.

The data, which has been subjected to the above-mentioned low-pass filtering process, is recorded in the recording medium 60. The data, recorded in the recording medium, may be individual signals that have been individually processed by the LPF 59, or may be a combined signal of these signals.

Additionally, in the above-mentioned Embodiments 1 through 5, the amount of image-shift is set less than one pixel in the horizontal direction or vertical direction. Here, in the case when the amount of image-shift is set larger than one pixel, the frequency component of a pattern that appears due to a light-quantity difference has a period of two times the component less than one pixel of the amount of image-shift. In other words, supposing that the amount of image-shift is X, the period is represented by $2\times(X-INT(X))$ (where INT(y) is a maximum integral number not exceeding y). For this reason, with respect to the low-pass filter to be used, it is necessary to select one that can cut the above-mentioned frequency component.

Moreover, in Embodiments 1 through 5, one combined image is formed from two original images; however, the present invention can be applied to cases in which one combined image is formed from more original images. In this case, it is necessary to properly select a low-pass filter that can cancel a light-quantity difference by taking account of the array of the respective original images.

Furthermore, a band-pass filter may be used in place of the low-pass filter described in Embodiment 1 through 5.

As described above, the image pick-up apparatus of the present invention is provided with a filter which corrects a light-quantity difference that appears between a plurality of original image signals due to the image-shifting operation; therefore, it is possible to suppress a striped pattern caused by the light-quantity difference, and consequently to improve the image quality.

Since the filtering process by the filter may be applied prior to the interpolation process after a plurality of original images have been combined, it becomes possible to reduce the amount of processes in the light-quantity difference correction (filtering), and consequently to allow high-speed processes.

Further, since the filtering process by the filter may be applied after the interpolation process of a plurality of original images, a striped pattern caused by the interpolation process can be suppressed simultaneously as the striped pattern caused by the light-quantity difference is suppressed, thereby making it possible to improve the image quality. Moreover, it is possible to accurately correct edges in the horizontal or vertical direction.

Furthermore, by setting the direction of the image-shift in a diagonal direction, it becomes possible to obtain high-quality images with fewer number of image-shifts.

Further, the above-mentioned filter may be provided as a two-dimensional low-pass filter whose pass band is set at the base band of the pixel array of the imaged data that has been formed by combining a plurality of original images, or as a one-dimensional low-pass filter whose cut-off frequency is set at the frequency components of the borders of the base band in the shifting direction of the image shift; thus, it becomes possible to positively suppress the striped pattern caused by a light-quantity difference.

Moreover, the above-mentioned filter is provided as a filter which cuts (or attenuates) at least the maximum frequency components in the horizontal and vertical directions of the base band of the pixel array of the image data that has been formed by combining a plurality of original images; thus, it becomes possible to cut frequency components related to portions having the most conspicuous striped pattern, and also to. refrain from cutting frequency components within the base band unnecessarily.

Further, the above-mentioned filter may be provided as a combined filter between a horizontal one-dimensional low-pass filter and a vertical one-dimensional low-pass filter, whose cut-off frequency is set at the maximum frequencies in the horizontal and vertical directions of the base band of the pixel array of the imaged data that has been formed by combining a plurality of original images; thus, it becomes possible to cut frequency components related to portions having the most conspicuous striped pattern, and also to refrain from cutting frequency components within the base band unnecessarily. The resulting effects are improvement of the image quality and simplification of the circuit construction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image pick-up apparatus comprising:

image pick-up means for picking up imaging light from a subject and forming image data;

image-shift means for shifting the image pick-up means to a plurality of relative positions with respect to the imaging light so as to allow the image pick-up means to form the image data at the relative positions;

image-combining means for combining a plurality of pieces of image data formed by the image pick-up means; and light-quantity difference correction means for performing image processing on the image data combined by the image-combining means, and for correcting a light-quantity difference between the plurality of pieces of image data, wherein the light-quantity difference correction means is constituted by a filter for removing a spatial frequency component that occurs due to the light-quantity difference between the plurality of pieces of image data.

2. The image pick-up apparatus as defined in claim 1, further comprising:

interpolation means for interpolating pixel data with respect to pixels having no pixel data that are located inside the combined image obtained by the image-combining means.

3. The image pick-up apparatus as defined in claim 2, wherein after the image data have been combined by the image-combining means, the light-quantity difference correction means carries out a light-quantity difference correction process on the image data prior to the interpolation-process by the interpolation means.

4. The image pick-up apparatus as defined in claim 2, wherein the light-quantity difference correction means carries out a light-quantity difference correction process on the image data after the interpolation process by the interpolation means.

5. The image pick-up apparatus as defined in claim 1, wherein with respect to the imaging light, the image-shift means relatively shifts the image pick-up means to a first position and to a second position that is shifted from the first position in the horizontal direction by half of a horizontal pixel gap and that is also shifted from the first position in the vertical direction by half of a vertical pixel gap.

6. The image pick-up apparatus as defined in claim 1 wherein the light-quantity difference correction means is constituted by a two-dimensional filter whose pass band is set at a base band of a pixel array of the combined image data that has been combined by the image-combining means.

7. The image pick-up apparatus as defined in claim 1, wherein the light-quantity difference correction means is a one dimensional filter in which, supposing that the shift amount by the image-shift means is X pixels (X>0), a spatial frequency having a period of 2×(X−INT(X)) in the shifting direction is set as the cut-off frequency thereof and a spatial frequency not more than said frequency is set as the pass band thereof.

8. The image pick-up apparatus as defined in claim 1, wherein the light-quantity difference correction means is constituted by a filter which attenuates at least a maximum spatial frequency component in the horizontal direction and a maximum spatial frequency component in the vertical direction within a base band of a pixel array of the combined image data that has been combined by the image-combining means.

9. The image pick-up apparatus as defined in claim 8, wherein the light-quantity difference correction means is constituted by a horizontal-direction one-dimensional low-pass filter whose cut-off frequency is set at the maximum spatial frequency of the base band in the horizontal direction and a vertical-direction one-dimensional low-pass filter whose cut-off frequency is set at the maximum spatial frequency of the base band in the vertical direction, said one-dimensional low-pass filters being series-connected to each other.

10. An image pick-up apparatus comprising:

an image pick-up means for picking up colored imaging light from a subject and for generating image data of "u" kinds per one imaging light;

image-shift means for shifting the image pick-up means to relative positions the number of which is represented by "v" (v≧2) with respect to the imaging light so as to allow the image pick-up means to form the image data at the relative positions;

image-combining means for combining pieces of image data the number of which is represented by "u×v" generated by the image pick-up means through the image-shift means for each of the "u" kinds; and light-quantity difference correction means for performing image processing on the image data combined by the image-combining means, and including a filter for eliminating a spatial frequency component that occurs due to light-quantity differences among the plurality of pieces of image data at the relative positions the number of which is represented by "v", for each of the "u" kinds of image data.

11. The image pick-up apparatus as defined in claim 10, further comprising:

interpolation means for interpolating pixel data with respect to pixels having no pixel data that are located inside the combined image obtained by the image-combining means.

12. The image pick-up apparatus as defined in claim 11, wherein after the image data have been combined by the image-combining means, the light-quantity difference correction means carries out a light-quantity difference correction process on the image data prior to the interpolation process by the interpolation means.

13. The image pick-up apparatus as defined in claim 11, wherein the light-quantity difference correction means carries out a light-quantity difference correction process on the image data after the interpolation process by the interpolation means.

14. The image pick-up apparatus as defined in claim 10, wherein with respect to the imaging light, the image-shift means relatively shifts the image pick-up means to a first position and to a second position that is shifted from the first position in the horizontal direction by half of a horizontal pixel gap and that is also shifted from the first position in the vertical direction by half of a vertical pixel gap.

15. The image pick-up apparatus as defined in claim 10 wherein the light-quantity difference correction means is constituted by a two-dimensional filter whose pass band is set at a base band of a pixel array of the combined image data that has been combined by the image-combining means.

16. The image pick-up apparatus as defined in claim 10, wherein the light-quantity difference correction means is a one dimensional filter in which, supposing that the shift amount by the image-shift means is X pixels (X>0), a spatial frequency having a period of 2×(X−INT(X)) in the shifting direction is set as the cut-off frequency thereof and a spatial frequency not more than said frequency is set as the pass band thereof.

17. The image pick-up apparatus as defined in claim 10, wherein the light-quantity difference correction means is constituted by a filter which attenuates at least a maximum spatial frequency component in the horizontal direction and a maximum spatial frequency component in the vertical direction within a base band of a pixel array of the combined image data that has been combined by the image-combining means.

18. The image pick-up apparatus as defined in claim 17, wherein the light-quantity difference correction means is constituted by a horizontal-direction one-dimensional low-pass filter whose cut-off frequency is set at the maximum spatial frequency of the base band in the horizontal direction and a vertical-direction one-dimensional low-pass filter whose cut-off frequency is set at the maximum spatial frequency of the base band in the vertical direction, said one-dimensional low-pass filters being series-connected to each other.

19. The image pick-up apparatus as defined in claim 1, wherein the light-quantity difference correction means is constituted by a one-dimensional filter whose pass band is set at a base band of a pixel array of the combined image data that has been combined by the image-combining means.

20. The image pick-up apparatus as defined in claim 10, wherein the light-quantity difference correction means is constituted by a one-dimensional filter whose pass band is set at a base band of a pixel array of the combined image data that has been combined by the image-combining means.

* * * * *

UNITED STATES PATENT AND TRADEMARK OFFICE

CERTIFICATE OF CORRECTION

PATENT NO. : 6,456,324 B1

DATED : September 24, 2002

INVENTOR(S) : Eiji Yamada and Toshiaki Harada

It is certified that error appears in the above-identified patent and that said Letters Patent is hereby corrected as shown below:

Title page,

Insert Item -- [*] Notice: This patent issued on a continued prosecution application filed March 6, 2002 under 37 CFR 1.53(d), and is subject to the twenty year patent term provisions of 35 U.S.C. 154(a)(2) -- and

Item -- [65] Prior Publication Data

US 2002/0126209 A1 September 12, 2002 --

Signed and Sealed this

Fifth Day of April, 2005

JON W. DUDAS

*Director of the United States Patent and Trademark Office*